United States Patent
Bergantino et al.

(10) Patent No.: US 7,904,817 B2
(45) Date of Patent: Mar. 8, 2011

(54) METHOD FOR CONTROLLING AND/OR MONITORING DATA PROCESSING DEVICE AND COMPUTER PROGRAM

(75) Inventors: Stefano Bergantino, Rome (IT); Luigi Gagliardi, Rome (IT); Marco Irione, Rome (IT)

(73) Assignee: Accenture Global Services GmbH, Schaffhausen (CH)

( * ) Notice: Subject to any disclaimer, the term of this patent is extended or adjusted under 35 U.S.C. 154(b) by 258 days.

(21) Appl. No.: 11/657,993

(22) Filed: Jan. 25, 2007

(65) Prior Publication Data
US 2008/0134073 A1   Jun. 5, 2008

(30) Foreign Application Priority Data
Dec. 1, 2006   (EP) ..................................... 06425816

(51) Int. Cl.
*G06F 3/00* (2006.01)
(52) U.S. Cl. ......... 715/740; 715/735; 715/741; 700/180; 700/266; 700/283
(58) Field of Classification Search .................. 715/700, 715/735, 740–741, 743, 762, 763; 700/17, 700/83, 180, 266, 283
See application file for complete search history.

(56) References Cited

U.S. PATENT DOCUMENTS

| | | | |
|---|---|---|---|
| 6,665,575 B2 * | 12/2003 | Betawar et al. | 700/121 |
| 6,697,690 B2 * | 2/2004 | Scholl et al. | 700/100 |
| 6,907,308 B1 * | 6/2005 | Bartlett et al. | 700/121 |
| 2004/0015269 A1 * | 1/2004 | Jungmann et al. | 700/283 |
| 2004/0078107 A1 * | 4/2004 | Chou et al. | 700/121 |
| 2004/0078182 A1 * | 4/2004 | Nixon et al. | 703/22 |
| 2005/0038565 A1 | 2/2005 | Power et al. | |

FOREIGN PATENT DOCUMENTS

| | | |
|---|---|---|
| WO | WO 01/04748 A1 | 1/2001 |
| WO | WO 03/032095 A2 | 4/2003 |

OTHER PUBLICATIONS

Vitharana et al., "Knowledge-Based Repository Scheme for Storing and Retrieving Business Components: A Theoretical Design and an Empirical Analysis", *IEEE Transactions on Software Engineering*, vol. 29, No. 7, pp. 649-664, New York, NY, Jul. 2003.

Meyer-Wegener et al., "Conceptual Workflow Schemas", *Cooperative Information Systems*, 1999 IFCIS International Conference, IEEE Computer Society, Sep. 2, 1999, pp. 234-242.

* cited by examiner

*Primary Examiner* — Boris Pesin
*Assistant Examiner* — Shen Shiau
(74) *Attorney, Agent, or Firm* — Brinks Hofer Gilson & Lione

(57) ABSTRACT

A graphical user interface, implemented in a standard system management environment, accepts selections of logical instruction steps that are external to the standard system management environment. The logical instruction steps may include process steps, specify chemical formulae, or identify other components of master recipes that control drug manufacture or dispensing, as examples. The external logical instruction steps are introduced into the standard system management environment and approved. The standard system management environment subsequently controls the drug manufacturing or dispensing processes according to the external logical instruction steps.

40 Claims, 24 Drawing Sheets

METHOD FOR CONTROLLING AND/OR MONITORING DATA PROCESSING DEVICE AND COMPUTER PROGRAM

BACKGROUND OF THE INVENTION

Priority Claim

This application claims the benefit of priority to EPO application Serial No. 06425816.3, filed Dec. 1, 2006.

TECHNICAL FIELD

The present application relates to a method for controlling and/or monitoring the manufacturing process and/or dispensing process of medical drugs, a data processing device for controlling and/or monitoring the manufacturing process and/or dispensing process of medical drugs and a computer program product.

BACKGROUND INFORMATION

In the pharmaceutical industry, stringent regulation is a key issue. Stringent regulation is a particularly key issue regarding the processes and functions associated with the development, production, and marketing of pharmaceutical products, e.g., chemical drugs. Very strict rules and regulations have been shaped by industry regulatory bodies. Particularly, very strict laws are applied in different countries regarding the development and production of chemical drugs. Indeed, the pharmaceutical industry demands absolute accuracy, and the highest quality standards, together with production flexibility and high productivity. As a consequence, the costs to establish accurate documented evidence that provides a high degree of assurance of consistent production keep rising. The costs to consistently produce a product meeting predetermined specifications, and quality attributes continue to increase.

Accordingly, many pharmaceutical companies are interested in improving and identifying alternatives to the cumbersome manual processes employed to compile batch records during production. Conventionally, paper documentation is widely used to record all the batch information produced across a specific lifecycle. Batch recording procedures are used that are based on conventional information systems referred to as electronic batch record systems (EBRS). Such systems are typically integrated into a conventional enterprise resource planning system employing very complex interfaces. Using such systems moves the complexity of conventionally known paper methods of compiling batch records during production from the production cycle to the Information Technology (IT) department, which has the responsibility of integrating various requisite systems. The costs of developing and maintaining such interfaces are very high.

Therefore, a need has long existed for a process control system and method that provides a simplified way to meet conventionally known standards in the production of chemical/medical drugs.

SUMMARY

The process control method for controlling and/or monitoring the manufacturing process and/or dispensing process of medical drugs may include:
providing a graphical user interface (GUI) that implements a visualization of a master recipe via a usability layer in a standard system management environment, such as an SAP environment (e.g., SAP R/3 and/or mySAP);
providing external logical instruction steps, manually and/or automatically selecting external logical instruction steps, which may be customized templates, such as process steps and/or chemical formulas of a master recipe from an external database through the graphical user interface (GUI), wherein the external logical instruction steps are external to an existing process management environment, such as a standard system management environment;
introducing selected external logical instruction steps into the standard system management environment;
approving the provisioning of external logical instruction steps in the standard system management environment; and
controlling and/or monitoring the processes according to the instruction steps provided by the standard system management environment.

Providing external logical instruction steps and/or approval of provided external logical instruction steps, which are input via a GUI, cannot be carried out by a standard system management environment, such as a standard SAP environment. Rather, provisioning external logical instruction steps generally has to be carried out by manually changing the standard system management environment, for example, by modifying the source code of the standard system management environment or functions that the standard system management environment uses. The process control system makes such manual customizations of source code unnecessary.

Conventionally, automatically managing the building of master recipes in a standard system management environment such as standard SAP is not possible. Rather, immense expenditures of time, resources, and money are required. The process control system and method reduces the complexity, and provides the ability to easily build master recipes. Programming each instruction step is avoided by retrieving them from a custom repository. The custom repository is built with a collection of customizations that are individually created on the system and then reused as needed.

The logical checks performed by the system management environment are provided independently from the respective data used by the logical checks, and external logical instructions may be introduced into the standard system management environment. The data, for example, master recipes, relationships of process steps, relationships of formulas, values of formulas and/or parameters thereof may be provided in external tables. In the event amendments to the data are required, the external tables can be changed in a simple manner, without requiring specific programming skills. However, the logic used to perform the necessary checks, verifications, and monitoring routines do not need to be changed. Such an easy update is not possible in a standard SAP environment. Rather, in a standard SAP environment the logic used to perform checks, verifications, and monitoring routines must be manually programmed, e.g., for changes to a specific master recipe, or related process steps and formulas.

A pharmaceutical manufacturing process may be provided or adapted, integrated and controlled in real-time with minimal paper documentation, by employing the process control system and method. The process control system may monitor processes, while monitored data may be stored in an external and/or internal database. The process steps ("PS") and the necessary data involved in the process steps may be stored in an external and/or internal database as well. Further, an electronic batch record can be created that includes all relevant manufacturing and quality specifications, data, and comprehensive information regarding the manufacturing of a given batch. Thereby provision of complete documentation of the production process, including the entire production flow is easily provided.

BRIEF DESCRIPTION OF THE DRAWINGS

The process system and method is described by example in the following enclosed figures. Specific features described in the figures are examples that may be arbitrarily combined with each other.

DETAILED DESCRIPTION

Figure 1:
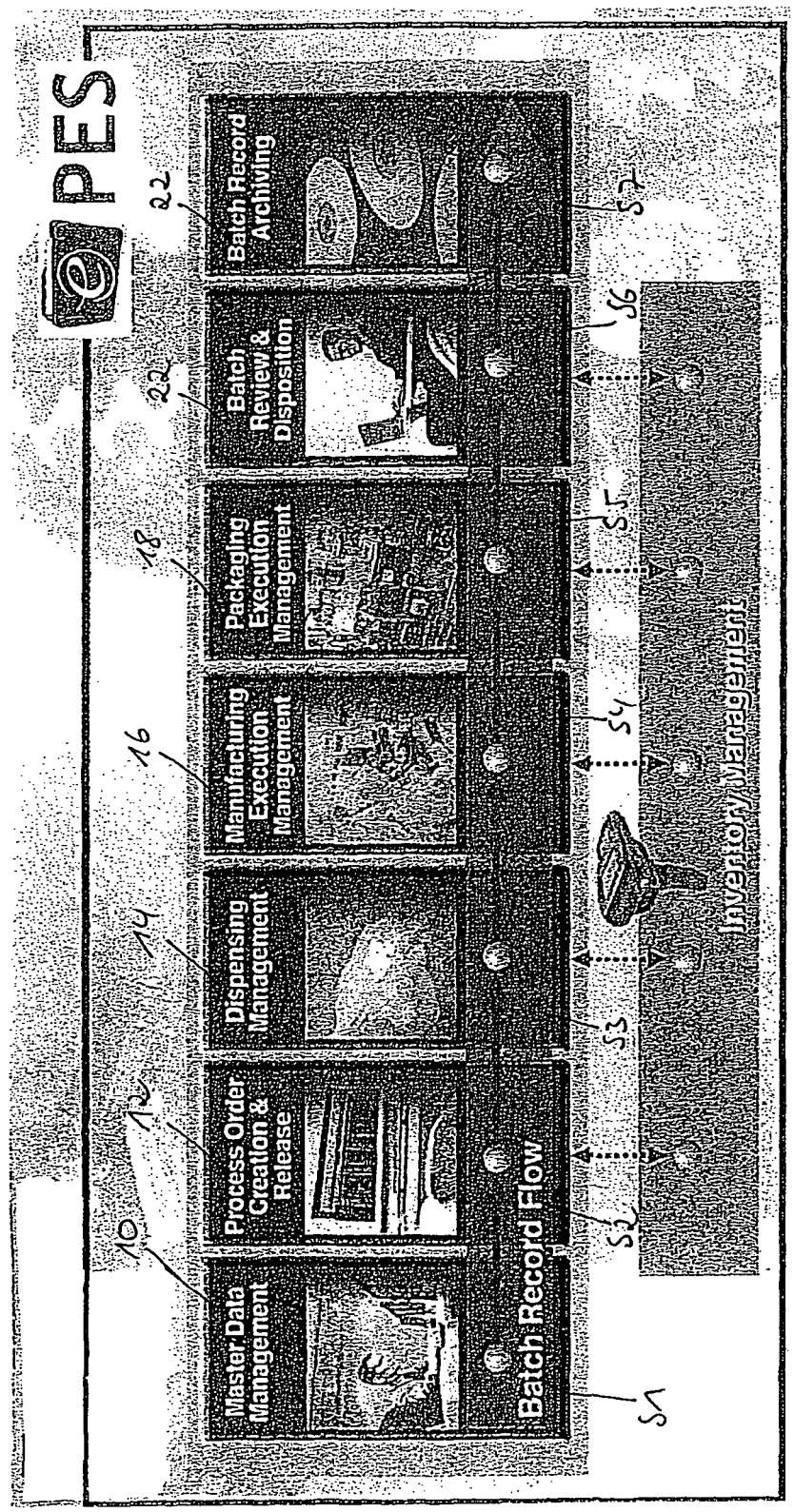
FIG. 1 shows a schematic overview of logical instruction steps.

FIG. 1 shows an overview of external logical instruction steps S1 to S7. In particular, as shown, step S1 may include the master data management, step S2 may include the process order creation and release, step S3 may include dispensing management, step S4 may include the manufacturing execution management, step S5 may include the packaging execution management, step S6 may include the batch review and disposition, and step S7 may include the batch record archiving.

Although FIG. 1 is a schematic view of an example process flow, FIG. 1 may also represent an example of a screen shot from process control system display. The schematic view of the steps S1 to S7 may also represent buttons 10 to 22 in a graphical user interface (GUI). By selecting one or more of the buttons 10 to 22, underlying external logical instruction steps may be chosen. In one implementation, a button may represent, and/or link to an external logical instruction step. As an example, button 10 may represent and/or link to a master data management step. In the master data management step S1, a process instruction sheet may be created. As a further example, the button 14 could present and/or link to the process order creation and release step S2. During this step, the recipe, materials, temperature, may be selected, deleted and/or changed. Button 16 could represent and/or link to the manufacturing execution management step S4. Accordingly, button 18 could represent and/or link to the packaging execution management step S5. When selecting the button 18, the user may further specify parameters of the instructions step S5, such as packaging material. Also, further steps within the packaging execution management step S5 may be automatically provided (e.g., monitoring, and/or checking the packaging, and the packaging material). Button 20 may represent and/or link to the batch review and disposition step S6, which may be chosen by the user. When selecting the button 20, the user may review all the preceding logical instruction steps. The user may review whether the correct components, weights, and packaging are applied. The review may be undertaken automatically or manually. In particular, the review may be accepted automatically, and/or manually by the user. When selecting button 22, the user may review the batch record archive, such as viewing an overview or other summary of the batch record archive.

As shown in FIG. 1, the method is self-explanatory and the user may be guided through the system by a GUI. Thereby, the user may perform the proper steps at the appropriate time, and prevent mistakes.

Moreover, using the process control system and method the very strict pharmaceutical regulations regarding monitoring may be fulfilled. The lack of and missing monitoring data are avoided, assuring that the entire production cycle is completely documented.

The process control system and method may be used to produce very consistent manufacturing process efficiencies, cost reductions and a high level of compliance with pharmaceutical industry regulations.

Figure 2:
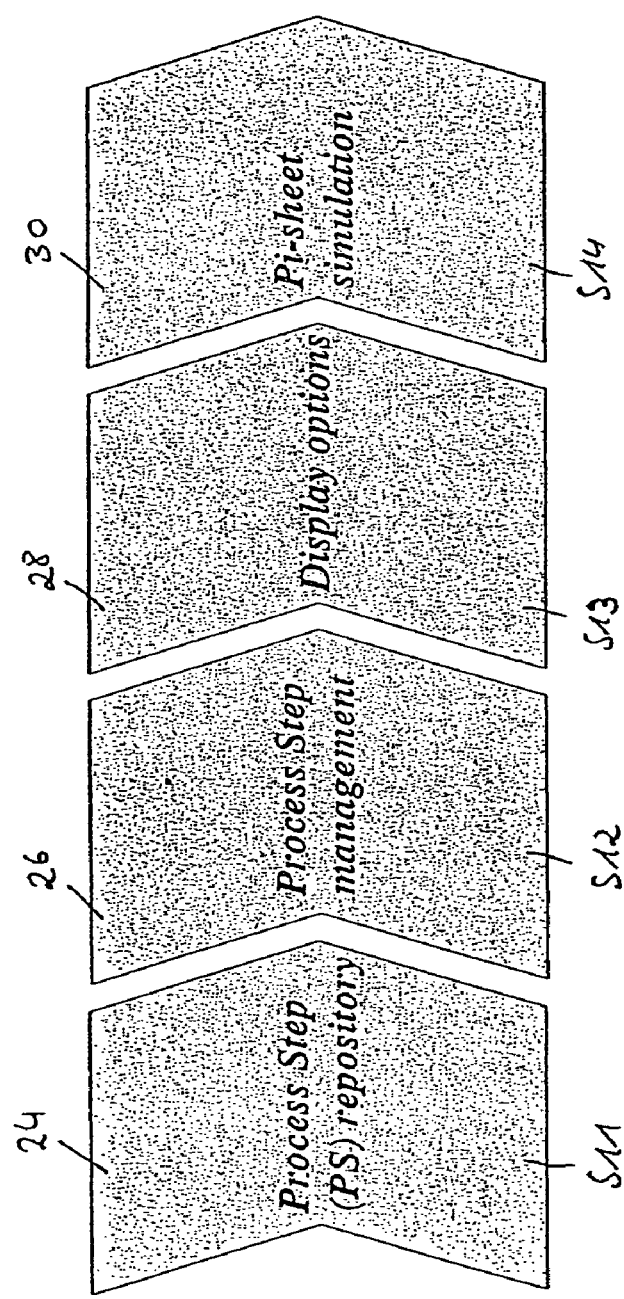
FIG. 2 shows a schematic view of a GUI and/or flow diagram.

FIG. 2 shows a schematic display that can be visualized or shown when selecting button 10 i.e., when selecting the master data management step S1. There can be provided four logical instruction steps, which can be chosen from. In other words, when selecting the master data management step S1 (i.e., when selecting button 10) one of more of the steps S11, S12, S13 and S14 as shown in FIG. 2, can manually or automatically be selected. Hence, steps S11, S12, S13 and S14 can be carried out when master data management step S1 is carried out.

Alternatively, FIG. 2 may also represent buttons 24 to 30 of a GUI. By selecting one or more of the buttons, specific logical instruction steps can be chosen. As an example, when selecting button 24, the process step repository can be chosen. When selecting button 26, the process step management can be activated. When selecting button 28, display options can be activated, i.e., display options can be changed or adapted. When selecting button 30, the external logical instruction step of the selection of a process instructions sheet can be activated. In other words, steps S11 to S14 represent exemplary external logical instruction steps, or a portal to external logical instruction steps, which can be selected by a user or which can be provided automatically, when starting the master management step S1.

Figure 3:
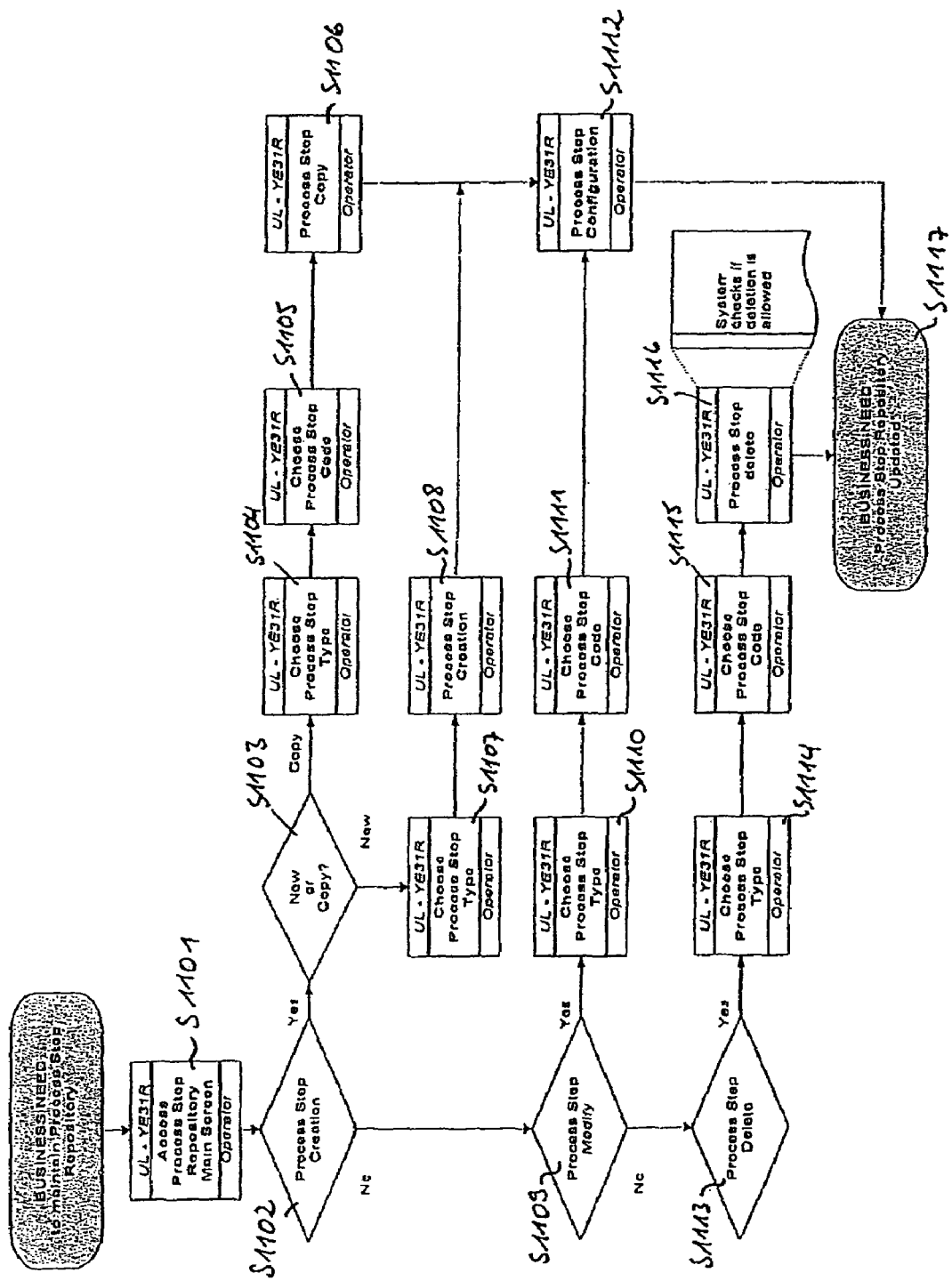
FIG. 3 shows a schematic view of a flow diagram.

FIG. 3 shows a flow diagram of the functionality carried out when button 24 is activated. FIG. 3 shows, as an example, the process steps that can be carried out after process step S11 is carried out, for example by a process step modification program running in the process control system. FIG. 3 shows the operations, manually and/or automatically, that may be carried out after the process step repository button 24 is activated. As an example, in step S1101, of an external logical instruction step, a graphical user interface is displayed that allows a user to create and/or modify and/or delete a process step. In particular, as indicated in S1101, the graphical user interface is provided to a user with operator rights, only. In other words, as a first step, whether a person selecting button 24 has the rights assigned to an operator may be verified. According to the description of the above figures, the functionality, as shown in FIG. 3, is performed when step S11 is executed at the time the respective program is run, which may be automatically executed (e.g., when step S1 is performed). The functionality, as shown in FIG. 3, may also be manually performed when button 24 is selected.

As a further example of the previous concept, the user can call the repository functionality by calling the corresponding program via transaction YE31R, mentioned in FIG. 3 step S1101 in the top of the corresponding box. In conventional SAP, typically programs may be executed using transaction codes. According to the example shown in the figures, the custom transaction is defined as YE31R. After calling the program, the user may use the respective tool in a graphical user interface to add, and/or remove, and/or modify process steps by pressing buttons.

In step S1101, the external logic instruction step is referred to as "UL-YE31R". Some of the following steps described below may be substeps of the external logical instruction step UL-YE31R. The following steps may also be external logical instruction steps. The substeps of an external logical instruction step may include steps conventionally known to the standard system management environment.

In step S1102, the user can choose whether to create a process step, whether to modify a process step or whether to delete a process step. In case the user chooses to create a process step, in step S1103, the user is asked whether to create a new process step or whether to copy a given process step. In case the user chooses to copy a process step, in step S1104 the user is provided with a list of possible process step types. The provision can be carried out by means of a list, in particular by means of a drop-down list in a GUI, etc. In subsequent step S1105, the user selects one or more process steps according to a specific process step code from the list of process steps. The "process step code" is an abbreviation of a process step, and does not necessarily represent "source code". The selected process step is then copied and introduced into the standard system management environment in step S1106.

In case the user selects in step S1103 to create a new process step, the user can be provided with a list of possible process step types in step S1107. The list of possible process step types can be a conventional drop-down list etc. After choosing the process step type in step S1107, the process step is created in step S1108.

On the other hand, if the user decides, in step S1102, not to create a process step, the user has to choose whether to modify a process step or not in step S1109. Subsequently, in step S1110, the user has to choose the process step type, according to step S1107 (see above). Thereafter, the user has to choose the specific process step, by choosing the specific process step code in step S1111.

In any case, either when creating a new process step according to step S1103 and the following steps or substeps, or when modifying a given process step according to step S1109 and the following steps or substeps, the specific process step is configured in step S1112.

In case in step S1109, the user decides not to modify a process step, the user can decide to delete a process step in step S1113. Subsequently, the user also has to choose a specific process step type of the process step to be deleted, in step S1114. Further to that, the user also has to choose the specific process step in step S1115 which is then automatically or manually deleted in step S1116. Following that, in steps S1114 and S1115 external logical instruction steps are manually selected by the user Steps S1114 and S1115 can themselves be external logical instruction steps. Step S1116 can be an external logical instruction step, which automatically is carried out by the system. However, during step S1116, the system verifies, whether the deletion is allowed. In other words, the system checks, if the user has the necessary rights, in order to instruct the deletion. In this specific example, the user has to be an operator, as indicated above. The system checks whether any subsequent conflicts could occur when deleting the process step.

In step S1117, the process step repository is updated according to the newly created process step and/or the modified process step and/or the deleted process step.

The display/GUI can then switch back to a display/GUI, comparable to FIG. 2, wherein the user may be allowed to choose one of steps S11 S12, S13 and S14 by selecting one of the buttons 24, 26, 28, or 30. Alternatively, the display can automatically display a graphical user interface, identical to a GUI, which is displayed when selecting button 26. In other words, the system can automatically move from step S11 to step S12.

Therefore, in the above description and also in the following description, as already indicated, the representation of the buttons is merely exemplary. One or more of the buttons can also be representations of process steps, one or more of which can be activated manually or automatically.

Figure 4:
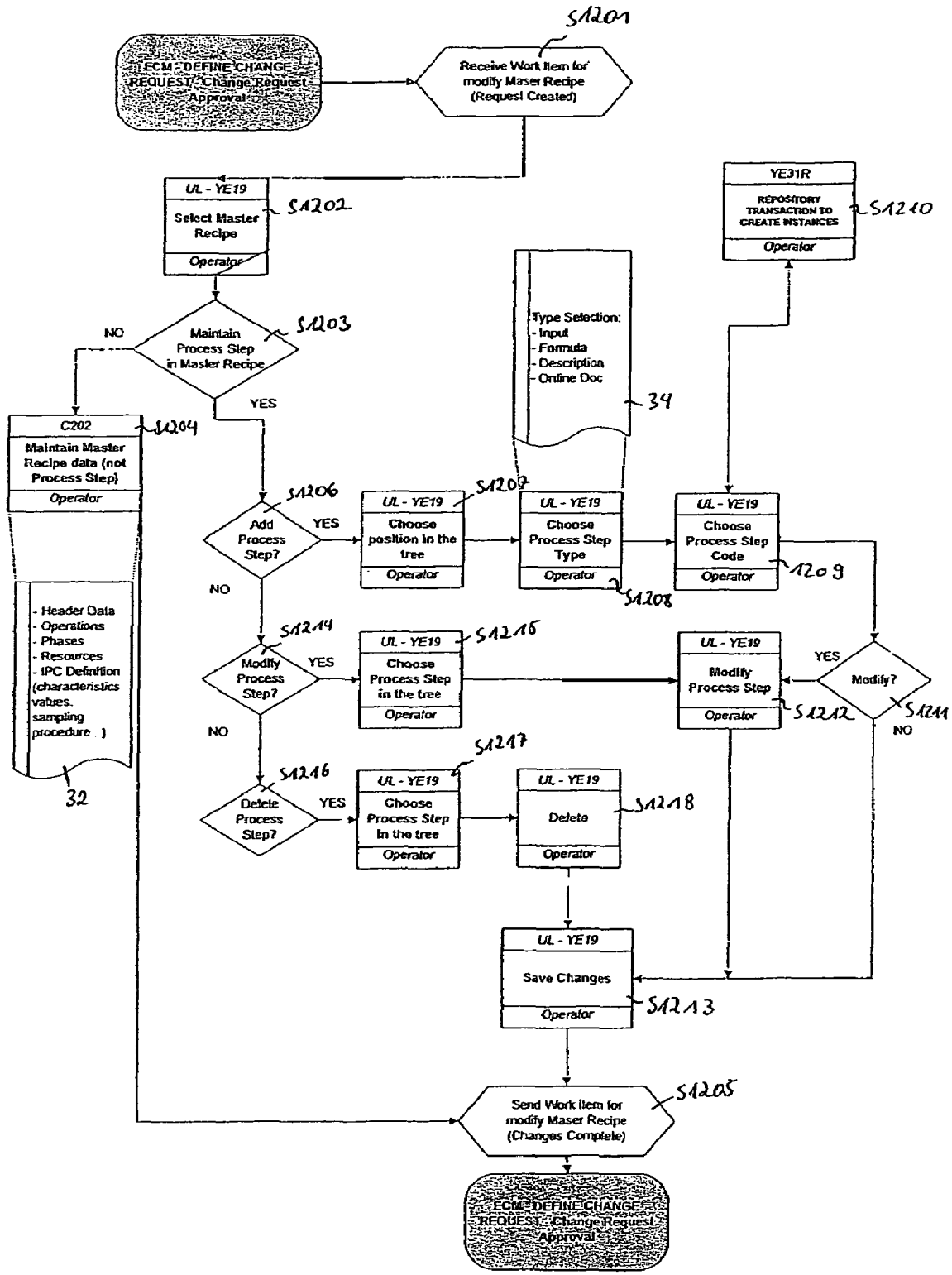
FIG. 4 shows a schematic view of a flow diagram.

FIG. 4 shows an exemplary flow diagram of process step management according to step S12. A process step management program running in the process control system may implement the logic shown in FIG. 4.

In particular, in FIG. 4, in an engineering change management (referred to as ECM) a change request should be defined and a change request should be approved. In particular, in step S1201, a work item is received for modifying the master recipe. In other words, a request is created. In particular, in step S1202, using the transaction referred to as "UL-YE19", the user can select a master recipe. In this example, the user has to be an operator. Typically, the box describing step S1202 includes three items. In the upper part, there is shown the transaction to be carried out by SAP. In the middle part, there is shown the action to be undertaken. In the lower part, there is shown the person/user who is allowed to carry out the action/or choose the respective transaction. The same holds for the boxes in FIG. 3. The terms "YE19" and "UL-YE19" can be used having similar meaning. In particular, the term "UL-YE19" relates to the usability layer and the corresponding program is called in SAP via custom transaction "YE19" (a transaction can collect one or more programs). The same applies for the term "UL-YE31R" and the term "YE31R", as shown in FIG. 3.

When selecting the specific transaction, e.g., the transaction "YE19", the system, automatically checks, if a process step is created having the same number as another process step, which is not created in the engineering change management ECM. In case such situation occurs, the system prevents the user from accessing the transaction UL-YE19, thereby avoiding short dumps.

Additionally, when entering the master recipe, the system may check whether any inconsistencies exist among the phases. In the event inconsistencies are identified, such inconsistencies are displayed and the user may be required to take further action. As an example, the user may have to leave a process step used in a formula if the process step number is changed manually. Such a change may be carried out in transaction C202 (see below). As an example, if the user attempts to remove an input related to a formula (operand) the system may restrict the user where the resulting formula is considered inconsistent. A consistency check of this type, provided by the process control system, is a custom check that is not performed in standard SAP, even though standard SAP may include transaction C202.

In particular, when entering and/or leaving the transaction UL-YE19, the system checks for custom inconsistencies during the building of the master recipe such as:

blocking factors like deletion of inputs related to formulas or master steps related to conditional steps warning message like changing of the limits of one input related to the formula expression.

Further to that, the system checks for standard inconsistencies. In particular, the system executes the following checks:

Possible inconsistencies in the master recipe's structure are retrieved. The retrieval is carried out by reading a custom table to check if the structure meets the requirements established in the custom table. In case inconsistencies are retrieved, the system displays the inconsistencies and requires the user to take proper actions. As an example, as already pointed out above, a process step used in a formula is indicated to be deleted, if the process step number is changed manually.

If a formula has been deleted, the system prompts the user if the input/parameters of the formula must also be deleted.

In case a master is deleted, the system warns the user that the corresponding slaves are reset in their slave characteristic so that they are not related to the deleted process step.

Since from UL-YE19, the user can access the standard transaction C202 (see below), in order to maintain a master recipe, when returning to the transaction UL-YE19, the system executes the consistency checks and warns the user of eventual inconsistencies carried out by modification done via the C202 transaction. As an example, in the C202 standard transaction, if a phase containing some steps related to other steps is removed, the standard check does not execute any check on the flow logic. When entering in the usability layer tool using the GIU the user is warned of potential inconsistencies, such as formulas with missing operands.

In step S1202, the user has to select a master recipe from a list of possible master recipes.

In step S1203 the user has to choose whether a process step, as one example of a external logical instruction step, should be deleted from or remain in the master recipe selected in step S1202.

In case the user chooses not to maintain one or more process steps in the master recipe, step S1204 is carried out. In step S1204, the transaction C202 is invoked. By transaction C202, the master recipe data is maintained. However, the process step is deleted. The transaction can be invoked by the operator, as shown in the box describing step S1204. In particular, also an object 32 involved by transaction C202 is shown in FIG. 4. The object may include:

header data;
operations;
phases;
resources;
IPC definition (characteristic values, sampling procedure . . . ); and
additional optional data fields.

Standard SAP may manage master recipes via the transaction C202, which may be included in standard SAP environment. In other words, the transaction C202 may be a standard transaction. The master recipes may be managed in SAP via the custom external transaction YE19, referred to as usability layer. The usability layer, although being referred to as external may be included, implemented, embedded, etc. into a standard system management environment, such as a standard SAP environment. A user may manipulate process instructions inside the master recipe in an easy manner and with a set of controls that guarantee consistently defined process steps.

The information of the object 32 can also be displayed in a display screen during the transaction C202.

In the subsequent step S1205, a work item can be sent for modification of the master recipe. In other words, in step S1205, an indication can be made that the changes are completed.

If in step S1203 the user chooses to maintain one or more process steps in the master recipe, in step S1206, the user can choose, whether to add another process step or not. In case another process step should be added, in step S1207, the user can choose a position in a tree for the process step. In other words, the user can choose, e.g., the position of the process step in a work flow by the transaction UL-YE19.

The system may allow a user to change the resource associated with the MR operations, and by doing so the following checks may be executed:

Meta Process Steps are changed depending on the control recipe destination; and

To do that the system reads a custom table in which the Meta PS are stored depending on the control recipe destination.

The meta process steps are particular process steps that are custom defined like the normal process steps, but are used for the definition of variables and objects required to correctly generate the process order or simulate the master recipe. The meta process steps may be defined in the same way as the (normal) process steps. However, the meta process steps are not used by the user to define flows inside the master recipe.

In particular, the user is allowed to select from a list of existing process steps, process steps to be added to the master recipe structure. When choosing the process steps, the system catches the process step, and before inserting it into the master recipe structure, executes the following checks:

If the process step is a formula, the system checks the inputs of the formula, and selects the inputs for insertion in the master recipe. Then the system checks whether the inputs are already present in the master recipe, and prompts the user to determine whether to reuse the existing inputs or whether new inputs should be added to the master recipe. In order to identify a process step in a formula a custom external table is read. The structure of the custom table contains a field that describes the kind of process step the selected process step belongs. To retrieve the inputs of the selected formula, custom text from an external text file is read, in which the formula is stated. The executed algorithm parses the file content to retrieve the component.

Conditional flows may be generated during the process by linking specific process steps (e.g., a decision process step) to groups of additional process steps that define additional/alternative flows. For instance, if the temperature of a material is too low, additional steps may be required to work with the material to reach the required temperature. The way to implement this logic is inside the definition of the templates. Each template is built with the option allowing links with other process steps i.e., combining the process steps like master and slaves. Each slave process step contains a reference to the master process step. Based on the condition selected in the master process step, this condition is checked with the condition selected by the operator to activate the conditional (slave) process step. If the condition is satisfied the alternative flow is activated.

In any case, the system fills the content of the predefined characteristics with consistent values for the master recipe structure. In order to retrieve the characteristics that should be evaluated a custom external table is read, in which the system can find (depending on a scenario) the consistent characteristics.

Once the position is chosen, in step S1208 the user can choose the process step type. In particular, the object 34 can allow the user to choose one or more of the following:
input;
formula;
description; and
online documentation.

In step S1209, the user can choose the process step code. When choosing the process step code, in particular, when adding a formula process step, the system checks the formula process step and makes all the necessary input(s) of the process step into the master recipe. In particular, when adding a formula process step, the system checks, if some of the inputs are already present in the master recipe. In the affirmative, the system asks the user if some or all of the inputs should be reused or not.

Next, step S1210 can be invoked automatically or manually. In step S1210, the transaction YE31R is invoked. By a repository transaction, instances can be created. When creating a process step in a repository, the system receives the allowed values for some characteristics by executing a report stored in a custom table. The custom table, as an example, is referred to as "YPSTEMP03" described later. If the user decides to delete an instance code, the system checks whether it is used in at least one master recipe. In case the instant code is used in at least one master recipe, the system does not allow the deletion. When modifying an instance code, if it is used in at least one master recipe, the system does not allow modifying all the characteristics. Rather, the system only allows modification of one or more of the modifications. As an example, if it is a formula, the formula cannot be modified.

Further to that, in the subsequent step S1211 the user chooses whether to modify the process step or not.

If the process step is modified, step S1212 is carried out. In particular, transaction UL-YE19 carries out a plurality of checks. If a value is modified, the system checks its validity. As an example, if an upper limit is set lower than a lower limit, an error is raised. Similarly, the user may condition the validity of a particular process step on another process step.

Conditions may be introduced into the master recipe linking some process steps, such as slaves and/or alternatives to a specific master process step. In this way the master process step drives the slaves process steps depending on the condition selected for the activation of the alternative flow. For instance, a master process step can be a check on the system asking the operator to verify the level of the pressure, the value of the temperature, the quantity of the material and so. Depending on the value inserted, the system can activate alternative and/or slave and/or conditional process steps that generate an alternative flow (e.g. if the pressure is too high, add a process flow that asks the operator to execute a set of actions in order to reduce the pressure at a specific range of values). This is technically implemented on the system linking the reference of the master process step to each slave process step with the condition. When the master process step is evaluated (e.g., input numerical filled with the value of a pressure) the system returns the condition (e.g., value inserted greater than the upper limit or less than the lower limit and/or value inside the range and/or value outside the range and so on) to each slave process step. If the condition is satisfied (e.g., value greater than upper limit) the conditional process step may be activated to allow the user to execute an alternative flow, which is technically executed linking variables through the master and slaves process steps passing variables that allow the comparison for the activation. A JavaScript function may be implemented, which is adapted to check the condition and in particular is adapted to show and/or hide the alternative flow into the browser Pi-Sheet page.

Additionally, the user can move a process step via a conventional drag and drop functionality. If the process step is an input of a formula (which can be part of a further process step) the interface may prevent movement of the process step to a position after the formula. When referring to the term position, a timely position in a work flow may be checked or validated by the interface. Also, a new process step can be introduced through the drag and drop functionality.

On the other hand, if the process step is a formula, the interface may prevent movement of the formula to a position which is before its input. Further to that, when the process step is a master, the interface may prevent movement of the process step to a position which is following to the position of its slaves. Accordingly, the interface may prevent movement of a slave process step to a position that is before the position of its master. Also, the system may prevent and/or prohibit a process step from moving to a phase belonging to a control recipe destination dummy. Additionally, further steps that should be inputs to the corresponding formula or formulas may be checked to ensure that they belong to the same operation and controlled recipe destination. The system may prevent and/or prohibit a user from moving process steps, and/or inputs of process steps, and/or the corresponding formulas to a different operation and/or control recipe destination.

In the subsequent step S1213, the changes may be saved and step S1205 may be carried out.

In case in step S1211, if the user chooses not to modify a process step, step S1213 is carried out i.e., the changes are saved and a work item is sent from the modification of the master recipe in step S1205.

In case step S1206 the user chooses not to add another process step, step S1214 is carried out. In step S1214 the user has to decide whether to modify one or more process steps. In particular, by selecting the displayed process step in the graphical user interface (e.g., by clicking on a respective button, double clicking on a process step on the master recipe tree, or choosing the process step from a drop-down list) the system provides the ability to change a process step's characteristics. However, before allowing any changes, the system may execute the following checks:

The system obtains the characteristics that the user may modify by checking the user's rights, and searching for the characteristics that can be modified by users having those rights. In order to do so, an external table is read with the instances selected. The fields content define which of the instances can be modified. In other words, one specific user can be allowed to change specific characteristics of the process step. Other process steps may only be accessible in display mode. The characteristics modifiable by the user are subject to some checks of validity. Such checks may include: value formats; units of measure, which may be extracted and listed by a custom program; on-line documentation in release status; signature strategy that is defined on the system extracted, and shown by a custom program called by a custom table in the database; and output formats that are defined in a list generated by a custom program referenced in a custom table in the database.

Once the user modifies a characteristic, the system checks if the chosen value is consistent. To do so, the system executes a function module, which logic has got the algorithm for it based on the characteristic's type.

The user may link a process step to another process step. In particular, the user can set a value of a predefined characteristic. Thereby, as an example, the user can provide a master-slave relationship between two or more process steps. Their predefined characteristics are defined in a custom table. The system checks whether a process step is related to another process step by reading the custom table. The custom table identifies for a given process step whether other process steps are related, and whether the related process steps are defined as masters of and/or slaves to the given process step.

In order to modify a process step, in the step S1215, as an example, the user may choose a process step from a tree. The tree may be displayed in a conventionally known data tree manner. Alternatively, the tree may be displayed as a scroll-down menu.

Once a process step is selected, in step S1212 the system allows, in particular via drag and drop functionality, to change the process step position in the master recipe structure. However, before allowing such a change, the system may automatically execute the following checks:

If a process step should be moved to a dummy control recipe destination, such movement is not allowed. The control recipe destination dummies therefore are defined in a custom table i.e., in an external table.

A formula cannot be moved in a position above its inputs. Therefore, the text contained in the formula is read and parsed by checking the position of the input(s) in the master recipe structure.

A process step slave cannot be moved in a position above its master. Therefore, a custom table is read, which contains the relationships between the process steps.

A formula cannot be moved to a phase belonging to a different control recipe destination.

A formula cannot be moved in a position between its inputs. In order to carry out the check, the text contained in the formula is read and, by parsing it, the position of the input and the corresponding position of the formula expression are checked.

As described above, after step S1212, subsequent steps S1213 and S1205 are carried out.

In case, in step S1214 the user decides not to modify a process step, the user may choose, whether to delete a process step in step S1216. In case the user chooses to delete a process step in step S1217, the user has to select a specific process step in a tree for deletion from the master recipe structure. After the process step has been selected, the system may automatically carry out the following checks:

If the process step selected for deletion is a formula's input, the system does not allow the deletion. In order to carry out the check, a custom external table is read, in which the process step is recorded as an input of a formula (if the process step indeed is an input of a formula).

The system checks, if the chosen process step is a master of another process step. In the affirmative, the system does not allow the deletion. In order to carry out the check, a custom external table is read, in which the process step is registered as a master for another one.

The logic carried out by the system management environment is provided independently from the respective data used by the logical checks, and external logical instructions can be introduced into the standard system management environment. The data, for example, master recipes, relationships of process steps, relationships of formulas, values of formulas and/or parameters thereof may be provided in external tables. In the event any amendments to the data are required, the external tables can be changed in a simple manner, without requiring specific programming skills. However, the logic used to perform the necessary checks, verification, and monitoring routines, do not need to be changed. Such an easy update is not possible in a standard SAP environment. Rather, in a standard SAP environment the specific checking, verification, and monitoring routines must be programmed (e.g., for every specific master recipe, or any specific formula or change thereof).

In step S1218, the process step chosen in step S1217 is deleted. The deletion can be carried out automatically. The deletion can also be activated manually. Once the process step is deleted, the system automatically resets the characteristics of one or more further process steps, which have a relationship to the deleted process step. As indicated above, if a process step should be deleted, the system checks if it is used in a formula. In the affirmative, it does not allow the deletion. Also, when deleting a process step, the system checks if it is a master of another process step. In the affirmative it does not allow the deletion.

Subsequently, steps S1213 and S1205 are carried out. In the following steps S13 and S14 (see FIG. 2) can automatically and/or manually be carried out. In particular, when performing step S14 a process instruction sheet ("PI" sheet) may be simulated, and the following checks may be carried out:

associate the bill of material ("BOM") to the operations;
confirm the positions are correct at the meta process step; and
master recipe inconsistencies.

In the above description of step S12, the necessary custom tables and/or custom files can be one custom table and/or one custom file. However, a plurality of custom tables may be provided. In particular, for every check carried out, and/or for every process step, an independent custom table can be provided. The custom tables may not be included in the standard SAP environment. Rather, the custom tables may be provided system specific. Accordingly, the custom files can be one ore more external files.

Summarizing, the process steps shown in FIG. 4 in one implementation of an external logical instruction step, the functionality of the transaction UL-YE19 allows a user to create, modify, and/or delete process steps as objects used in a master recipe. In one implementation, the transaction may execute the following checks.

When creating a process step, depending on the instance chosen by the user, the systems checks which are the user relevant characteristics and displays them so that the user can modify the value. The further/remaining characteristics are created automatically, but not displayed to the user. This is done by reading custom tables containing this information.

When modifying a process step, the system checks the consistencies of the value(s) inserted in the characteristic. To do so, the system executes a function module which logic has got the algorithm for it based on the characteristics type.

When deleting a process step, the systems checks if the process step is used by any master recipe. In the affirmative, a list of master recipes, using the process step, is created and the deletion is not allowed.

One or more lists of values of certain user relevant characteristics are populated by executing custom reports which names are stored in custom tables. These reports are automatically generated by a function module depending on the content of a custom table at the very beginning of the installation of the system according to the present application.

Figure 5:
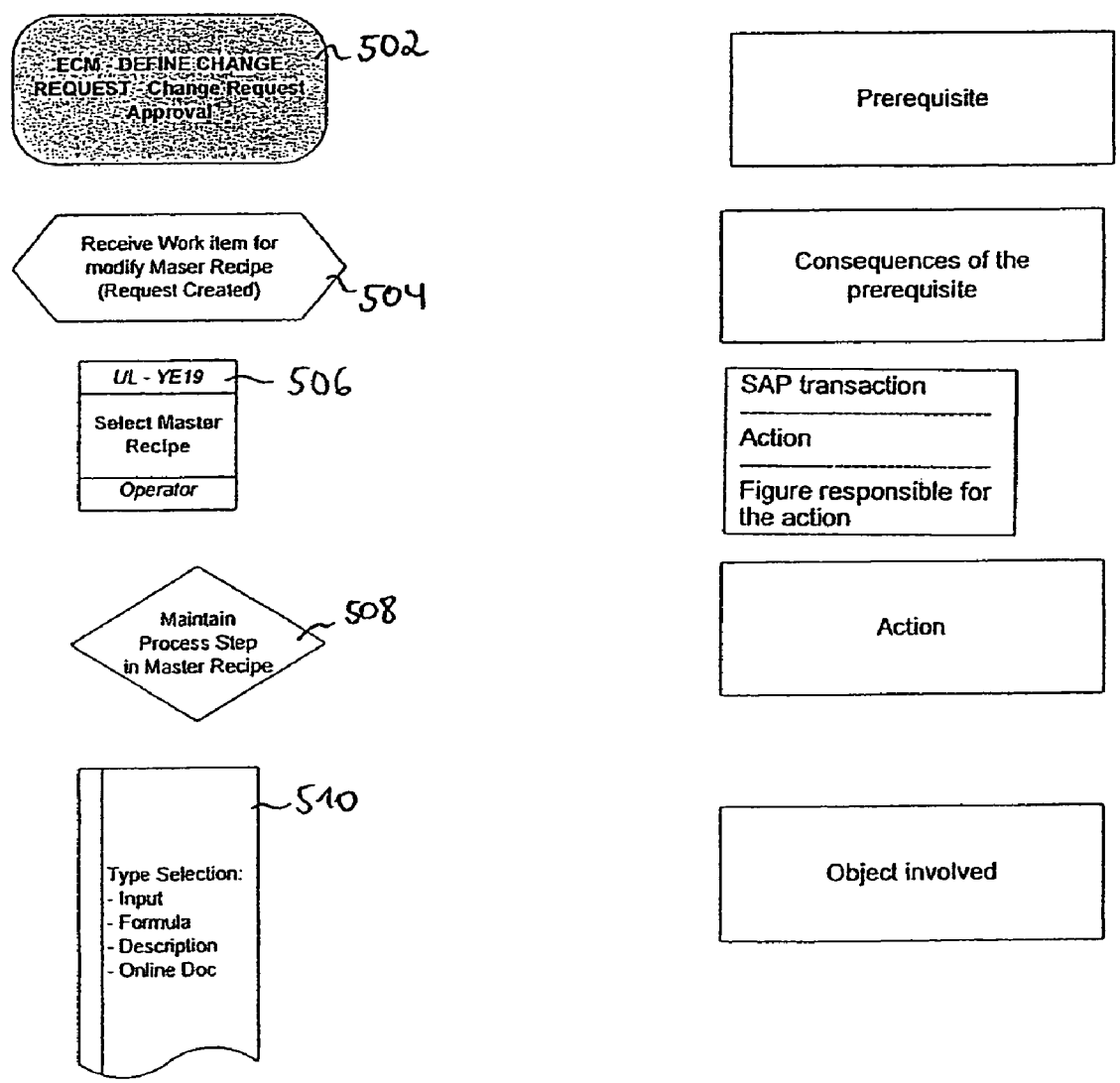
FIG. 5 shows a legend for a flow diagram.

FIG. 5 shows an explanation of the symbols used in FIGS. 3 and 4. The first symbol is a prerequisite symbol 502. In FIG. 4, for example, step S1201 has the prerequisite that an ECM request needs approval. The second symbol is a consequence symbol 504. The consequence symbol 504 may show actions taken, such as receiving a work item for modifying a master recipe. The third symbol is a transaction symbol 506. The transaction symbol 506 may show transactions executed by the process management environment, such as the SAP environment. The transaction symbol 506 shows the particular transaction, the action taken, and the actor responsible for taking the action. The fourth symbol is a decision symbol 508. The decision symbol 508 may specify a decision test that may result in branches to other actions. The fifth symbol is a object symbol 510. The object symbol 510 may specify an object involved with any given action.

Figure 6:
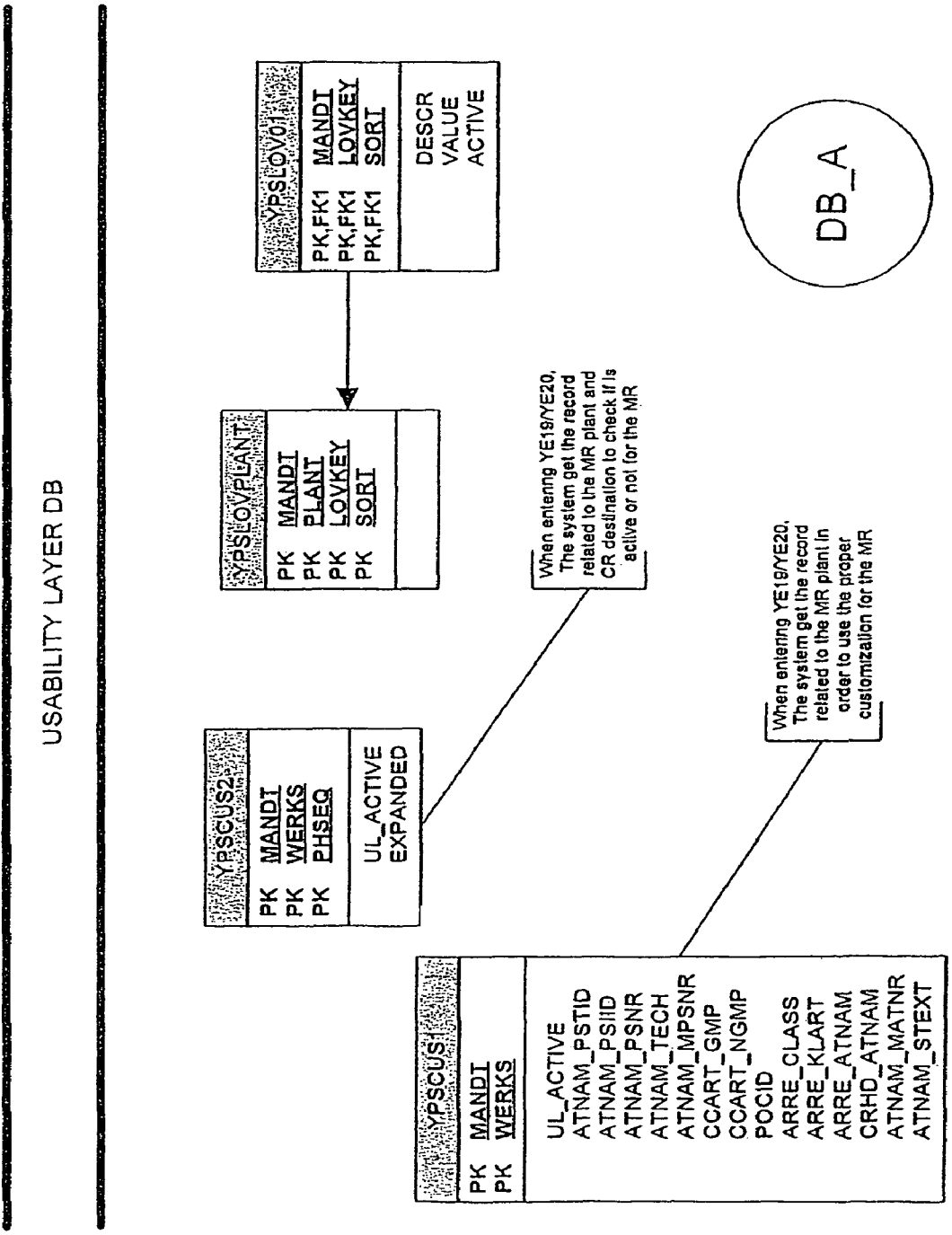
FIG. 6 shows an exemplary schematic view of a database.

In FIG. 6 exemplary tables/data bases are shown, which are used for the above described checks. In particular, in FIG. 6, the tables relate to the transaction UL-YE19. The exemplary tables shown in FIG. 6 are described below:

YPSCUS1:
  The YPSCUS1 table defines characteristics relevant to YE19 consistency and flow. The content of YPSCUS1 may determine which characteristic enables certain checks (i.e., depending on the value of the characteristic that defines a master may enable YE19 to execute all master related checks).
  The table YPSCUS1 is a control table that may include a collection of characteristics, which may be basic elements of process steps or templates. As an example, characteristics of a technology may be defined, and/or controls may be activated, that may be activated for a specific production line. For instance, a specific machine may be specified and/or activated. The characteristics may be checked by program(s) in order to execute specific logic.

YPSLOVPLANT/YPSLOV01:
  The YPSLOVPLANT/YPSLOV01 tables are relevant to determine the list of values allowed for certain characteristics depending on a certain key, which may determine a differentiation in flow that can be built via YE19.

Figure 7A:
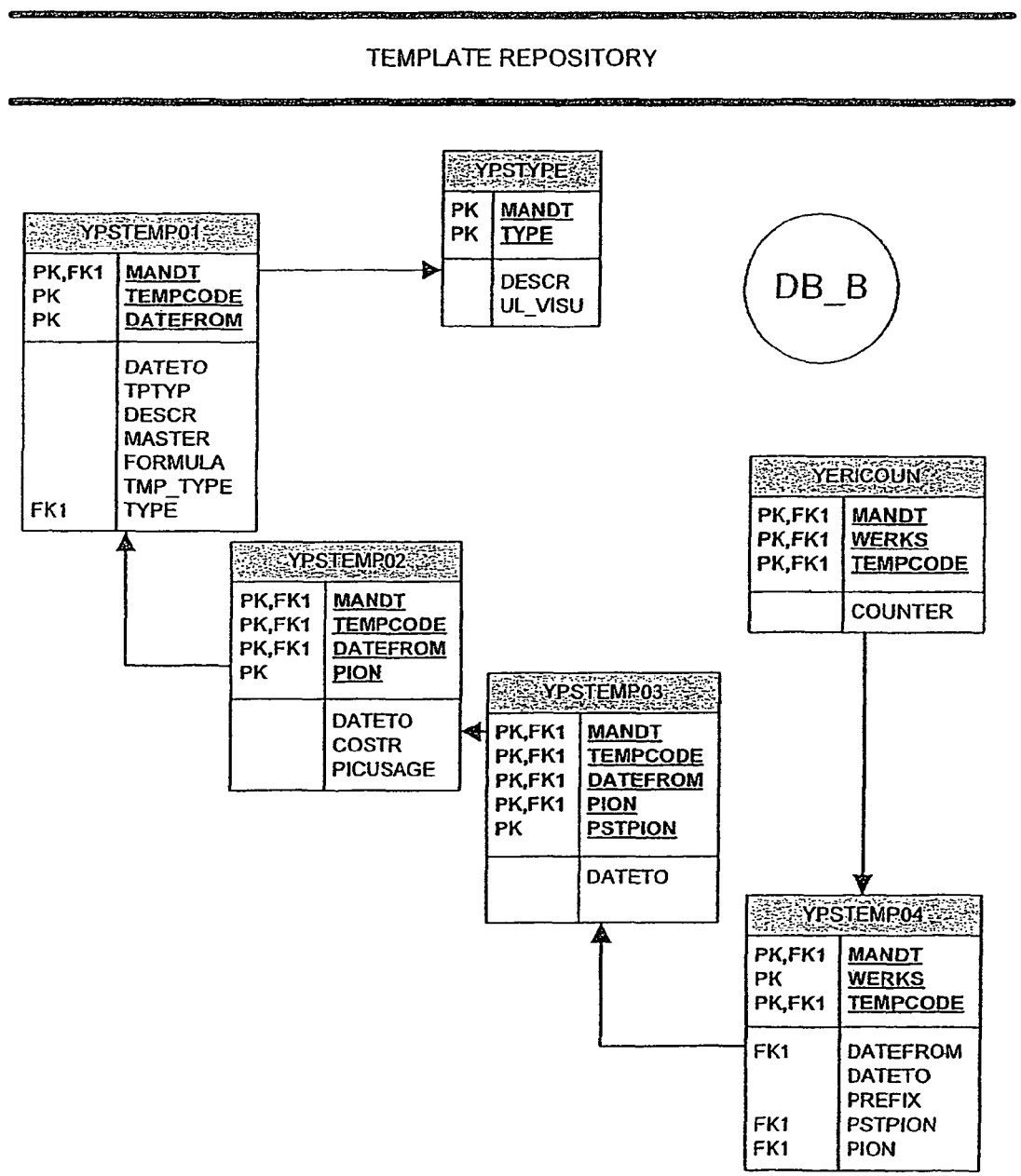
FIG. 7a shows an exemplary schematic view of a database.

Example tables are shown in FIG. 7a for the template repository management described below:

YPSTEMP01:
  This table is responsible for the following checks:
  process step (PS) typology depending on the content of one of its field (this can determine the definition of a process flow rather than another);
  PS link to alternative PS to define different flows; and
  PS typology time validity (depending on the date a PS can be valid or obsolete).

YPSTEMP02:
  PS usage definition (depending on the content of one of its fields, a PS is handled as a header (i.e., comprising data) or as a Body (i.e., comprising logic)).
  PS usage time validity (depending on the date a PS can be valid or obsolete).

YPSTEMP03:
  PS characteristic assignment (definition of the characteristic belonging to a PS).
  Definition of a value rule (depending on the content of one or more of its field the characteristic can have its value from an algorithm rather than another, this causes a differentiation in the flow definition).
  Meaning of the characteristic (depending on the content of one field a characteristic can have a meaning rather than another, this causes a differentiation in the flow definition).
  User defined or background defined (depending on the content of a certain field the characteristic can be relevant for the user or not, this causes the definition of foreground process or of a background process).
  PS type, depending on the content of one of its field the characteristic can get a format or another (a list of values or a button etc . . . ) in the YE19 PS display interface.
  PS value assignment, if a PS is a list of selectable values the values may be retrieved by executing a report whose name is stored in one field of this table.

YPSTEMP04:
  Definition of the naming convention for the PS, depending on this a PS can be used in a plant rather than another, so it can be defined to be used in a flow rather than another.
  PS naming convention time validity (depending on the date a PS naming convention can be valid or obsolete).

YERICOUN:
Number range definition for the PS.

YPSTYPE:
  defines if a PS typology has to be displayed or not in the transaction YE19, this causes the definition of a foreground or a background process.

Figure 7B:
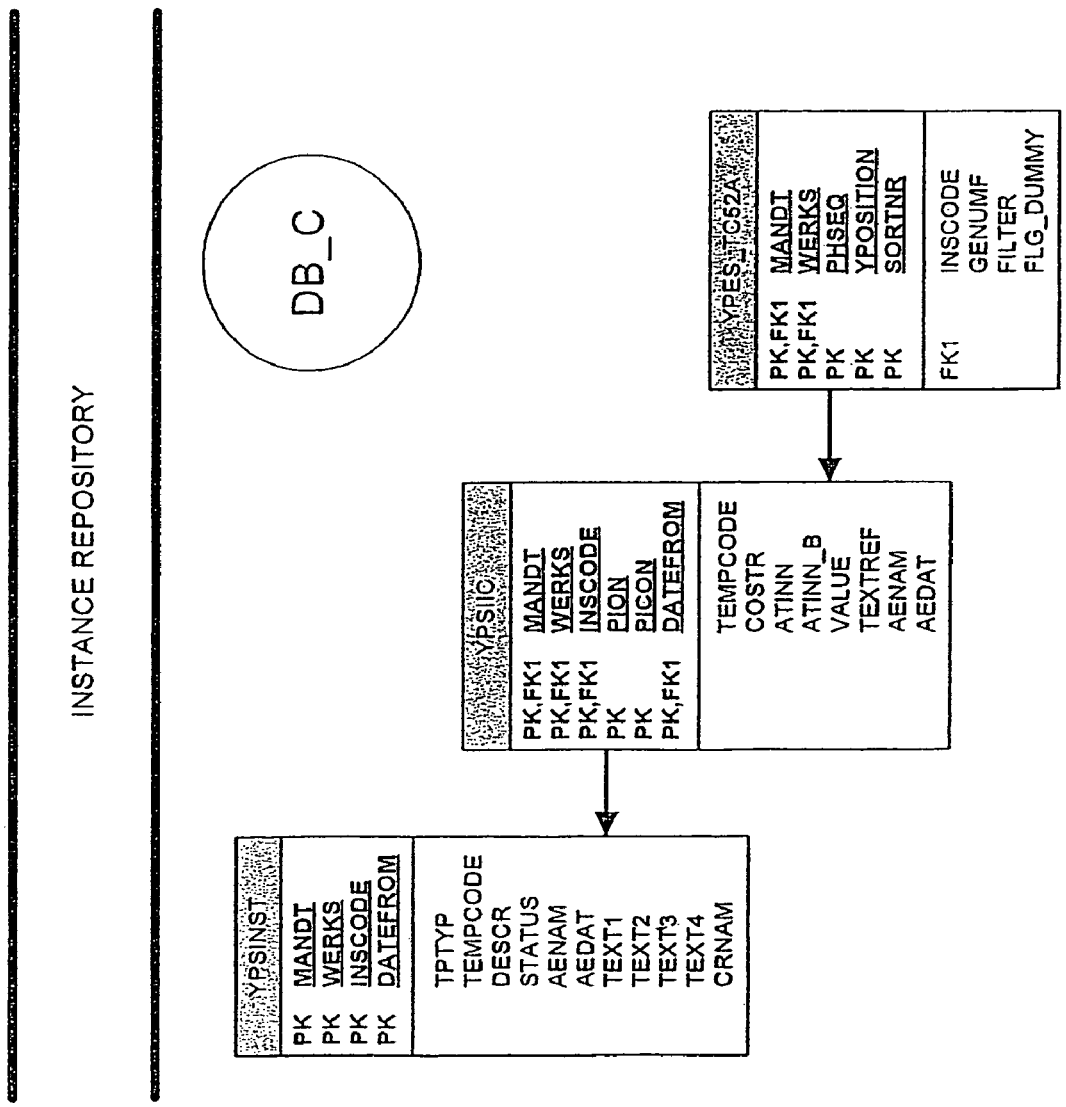
FIG. 7b shows an exemplary schematic view of a database.
Figure 7C:
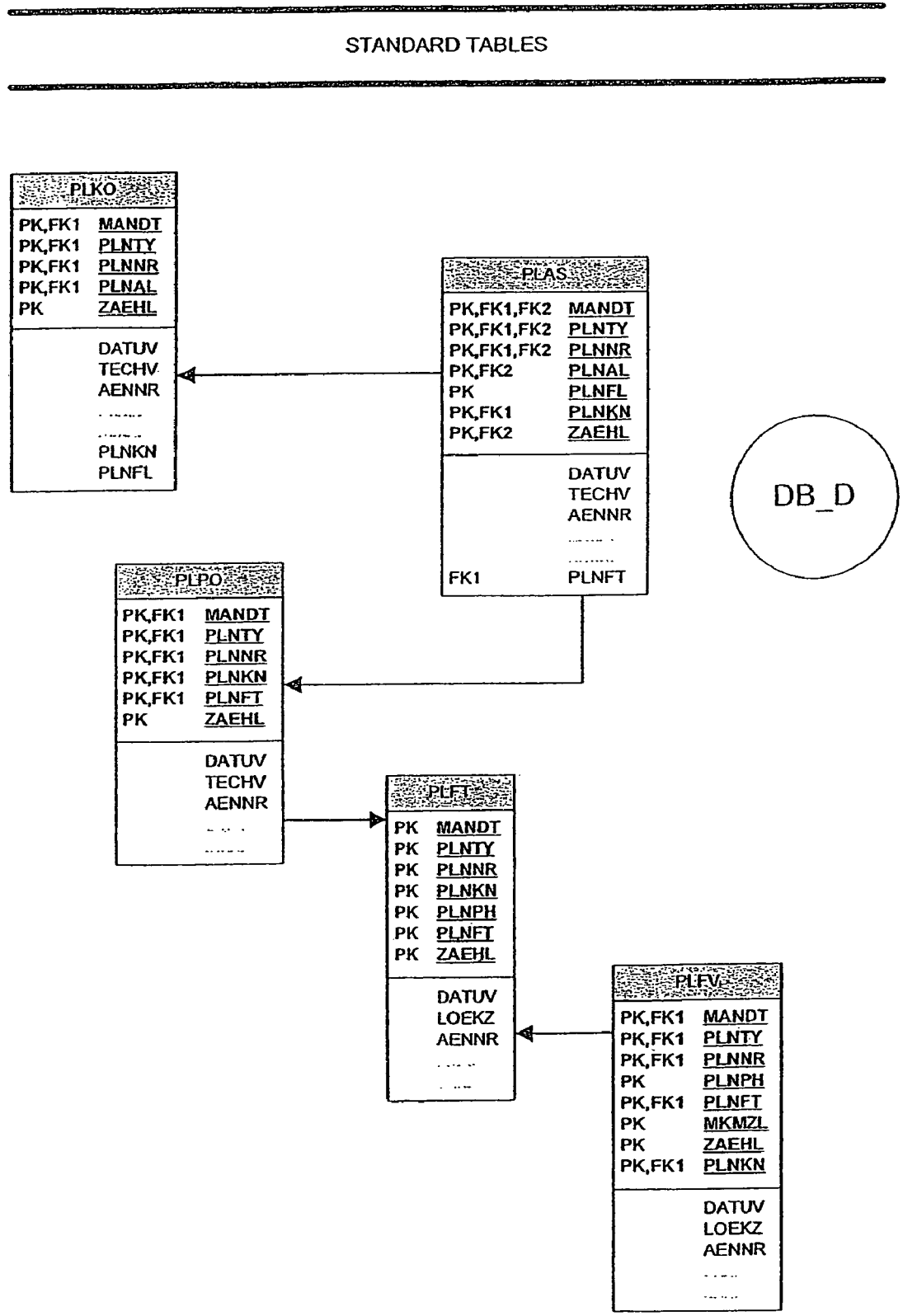
FIG. 7c shows an exemplary schematic view of a database.

Further to that, in FIG. 7b and in FIG. 7c there are shown exemplary tables for the instance repository management as well as standard tables.

In particular, the exemplary data bases/tables, as shown in FIGS. 6, 7a, 7b and 7c relate to the transaction UL-YE19 which is used for maintaining master recipes. The transaction UL-YE19 allows the user to handle complex objects in an efficient and simple manner. Once the master recipe has been created, the user can access UL-YE19 to manage the master recipe. In particular, the transaction UL-YE19 may:
  add process step(s) to the master recipe structure;
  delete process step(s) from the master recipe structure;
  modify process step(s) in the master recipe structure;
  modify process step(s) position in a master recipe structure;
  simulate the creation of a PI sheet;
  display the master recipe structure depending either on the primary or on the alternative resources; and
  check consistency, when accessing/leaving the transaction.

Summarizing, a usability layer is provided that may include the functionality as described by steps S11, S12, S13 and S14 in FIG. 2. The usability layer may include: the repository management section; and the master recipe management section.

The repository management is particularly carried out via a custom program, such as transaction UL-YE31, as shown in FIG. 3. In particular, via the custom program, process steps may be matched. Basic process steps may include the following attributes:
  Text: Allowing the user to define a long text, such as instructions to be followed by the operator.
  Numerical: Allowing the user to insert/input numerical values such as numbers, time or date. As an example, limits of the values and target values are defined to guide the user during the operation. Also the unit of measure as well as a brief description thereof can be provided.

Alphanumerical/checkpoint: Allowing the user to select one value from a set of possible "conform" and "not conform" values or insertion of a free text. Also a brief description of the step can be provided.

Formula: Allowing the user to obtain the result of the expression defined in the step itself, related to the inputs linked and defined in the expression. This step can also be provided with limits and target values, unit of measure and a brief description.

On-line documentation: Allowing the user to associate the process step to a document in the system management environment, such as SAP or in an external system. The step may be configured for the display, or printing of the document. A long text, such as instructions to be followed by the operator, can also be added to this process step.

Each process step can be defined with or without signature. As an example, in order to complete the step it may be required to insert one or more electronic signatures defined in the step itself.

The basic process steps can be defined in standard SAP using standard and custom characteristics. The logic defined in the process steps, however, is defined customized.

The actions allowed in the repository are:
process step creation and respective checks;
process step modification and respective checks;
process step deletion and specific checks. In particular reference can be made to a so called "where used list", i.e., to check whether process steps are used in other logical instruction steps or not. The specific process steps can be referenced.

Figure 8:
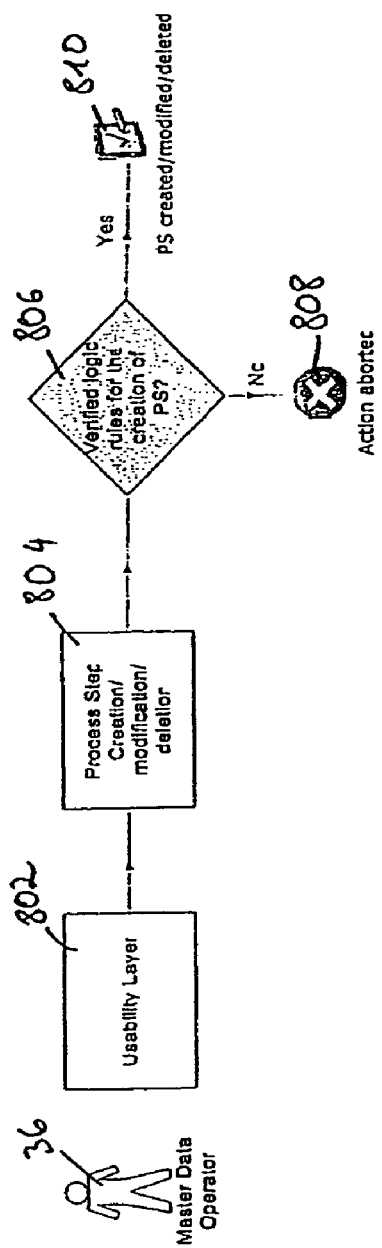
FIG. 8 shows a schematic view of a flow diagram.

FIG. 8 shows an exemplary schematic overview of a simple repository management. A master data operator 36 can access the usability layer (Act 802), which, in turn, can carry out process step creation and/or modification and/or deletion (Act 804). As an example, the creation of the process step can be verified (Act 806). If the verification is negative, the action can be aborted (Act 808). If the verification is positive, the process step can be created and/or modified and/or deleted (Act 810).

Referring to the actions of the repository, further details are described in the following.

Process Step Creation and Respective Checks:

Instances of the basic process steps may be created in the repository, as previously mentioned, and used in the assignment of the master recipe, which may be referred to as master recipe management. The checks executed by the system may include the following:

Whether mandatory fields are entered. A basic process step cannot be created if mandatory fields are not entered. The mandatory fields may be mapped in a specific custom table such as YPSTEMP03. Accordingly, flows are not created when mandatory parts are missing.

Inconsistent limit values, for example, for numerical process steps, cannot be defined. A lower limit cannot be defined that is higher than an upper limit. Limits' values cannot be defined with incompatible formats. The unit of measure used to associate a step may be selected from a set of values organized in a drop-down list. The drop-down list may be generated by a program called by the tool accessing to the table YPSTEMP03. The YPSTEMP03 table may contain, for a given type of process step, a collection of all the characteristics or attributes of a process step. For the unit of measure, characteristics of a specific program may be defined in the system executed to retrieve from the system the selectable list of unit of measures.

A formula missing operators and formula expressions that are inconsistent with the output format cannot be defined. The same checks may be executed with the list of numerical inputs.

An online documentation process step cannot be defined without a reference to a specific document.

Figure 9:
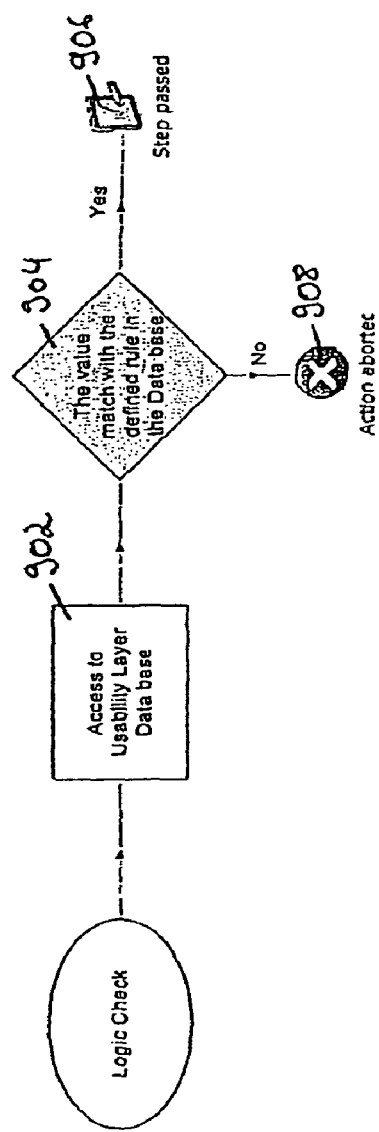
FIG. 9 shows a schematic view of a flow diagram.

The checks, describe above as examples, are shown in the schematic overview of FIG. 9. The logic checks and accesses the usability layer database (Act 902). Whether a value matches a defined rule in a database can be checked (Act 904). If the value matches the defined rule the step is passed (Act 906), otherwise, the action is aborted (Act 908).

Process Step Modification Checks:

Selected process steps may be modified according to rules defined in the logic of the tool. As an example, some of the rules may be mapped in the custom i.e., external database. The rules may be similar to the rules used during the process step creation phase, as described above.

Figure 10:
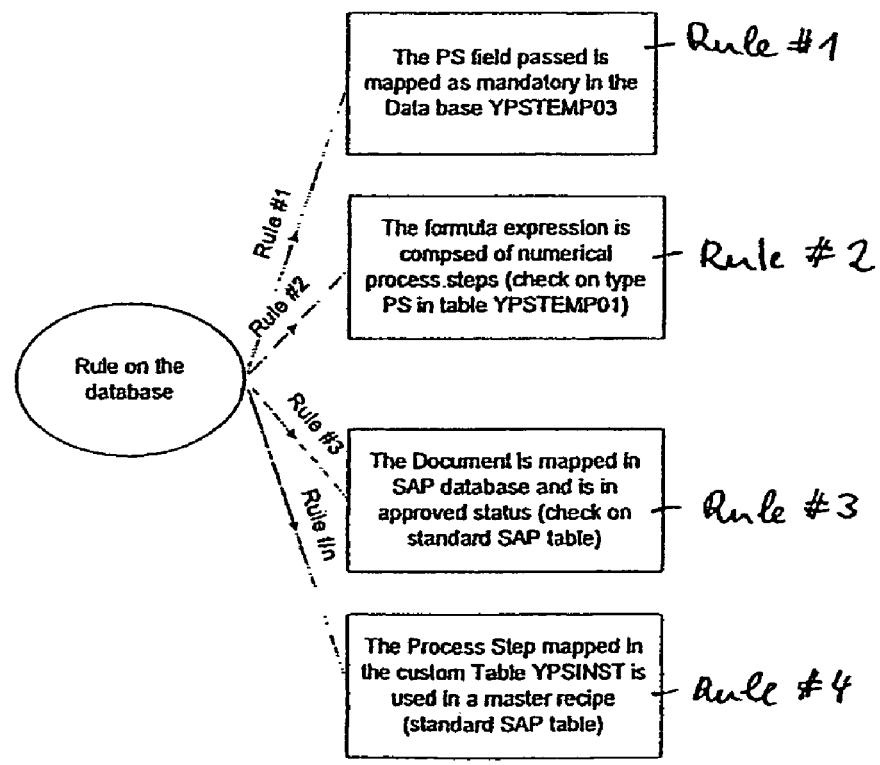
FIG. 10 shows a schematic view of rules on databases.

Process Step Deletion Checks:

A process step cannot be deleted if it is used in a master recipe. Therefore, a list can be created indicating which process steps are used. As an example, a schematic overview of such a rule database 1000 is shown in FIG. 10. In particular, four exemplary rules are shown in FIG. 10, however, as many rules as necessary may be provided.

Rule number 1 (referred to in FIG. 10 as "rule#1") indicates that the process step field passed is mapped as mandatory in the data base YPSTEMP03.

Rule number 2 (referred to in FIG. 10 as "rule#2") indicates that, if a formula expression is composed of numerical process steps, a check on the type of process step in table YPSTEMP01 is carried out.

Rule number 3 (referred to in FIG. 10 as "rule#3") indicates that, if the document is mapped in an SAP data base and is in approved status, a standard SAP table is checked.

Rule number 4 (referred to in FIG. 10 as "rule#n") indicates that the process step which is mapped in the custom table YPSINST is used in the master recipe (standard SAP table).

The process steps added from the repository to the master recipes may be mapped in two custom tables (YPSINST and YPSIIC) that contain the header and details of the process step. These process steps may be created in the repository through the usability layer via the repository tool. A process step created in the repository may also be an instance of a template. The instance is given a unique name based on the rules defined in the YPSTEMP04 table.

The usability layer also may include the master recipe management, and provide the ability to insert, modify, move and delete process steps inside a master recipe, as exemplary shown in the flow diagram of FIG. 4. This tool can be used by the master data operators to build the flow followed in the production line.

In one implementation, the process control system allows a user to build a master recipe in a standard system management environment, e.g., a standard SAP environment. However, a large number of automatic checks may be added to verify the correctness of the definition of the flow via the custom usability layer. Another characteristic of the process control system is that it allows the master data operator to rapidly build a master recipe using a graphic layer i.e., a GUI. Thereby, it is very simple for a user to follow the necessary steps, particularly using the basic instructions, which can be preloaded in a custom repository. The main checks implemented in the usability layer ensure that an operator builds a master recipe without errors.

Document (Standard Operation Procedure)

Online documentation of process steps in the flow may be added with references to documents in an approval status. In this way, procedural documents that are obsolete or not approved are not shown during production. When this check is executed, the documents available to the master data operator are filtered by the status of the document itself. As an example, the status of the document may be approved or not approved. The status may be checked using a standard SAP table. As an example, the documents may be stored in a standard SAP repository.

Technology Definition

An order may be executed on different production lines, e.g., different facilities that may require some deviation from a defined process. As an example, each production line may require additional/alternative steps to execute the same process. The process control system and method associates the technology compatible with the production line with each process step, so that only the steps compatible with the resource selected may be made available to the operator. For example, if one production line requires that a drug be rotated before the packaging process, the process step to rotate the drug is displayed to the operator if that production line is selected for the process. If the step is optional the operator may choose the step, otherwise, the step is introduced into the master recipe, and/or PI sheet automatically.

Selecting the possible technologies for each process step may require a query to a custom table (YPSTEMP03) to be performed for each mapped template with reference to the characteristic related to the technology. The query returns a program name that is executed to retrieve from the system the allowed technologies applicable to the process step.

Conditional Flow

Conditional flows may be defined in the master recipe. In other words, a process step may trigger the activation of additional process steps. As an example, if a check on the pressure of a mixture has not reached a minimum value, the operator—by entering the actual pressure value on the step—will automatically activate additional steps to be followed to keep the mixture to a predefined temperature for additional time. The predefined temperature is maintained until the right pressure is reached. During the master recipe build, the necessary additional steps, such as mixture to a specific temperature or for a specific time frame, may be added as conditional to the main step. For example, the value of the pressure may be a conditional step. The activation condition may be set for the conditional steps related to the minimum value of the pressure to be inserted by the operator. The main step may be considered the master step, and the additional steps may be considered the slave steps.

Figure 11:
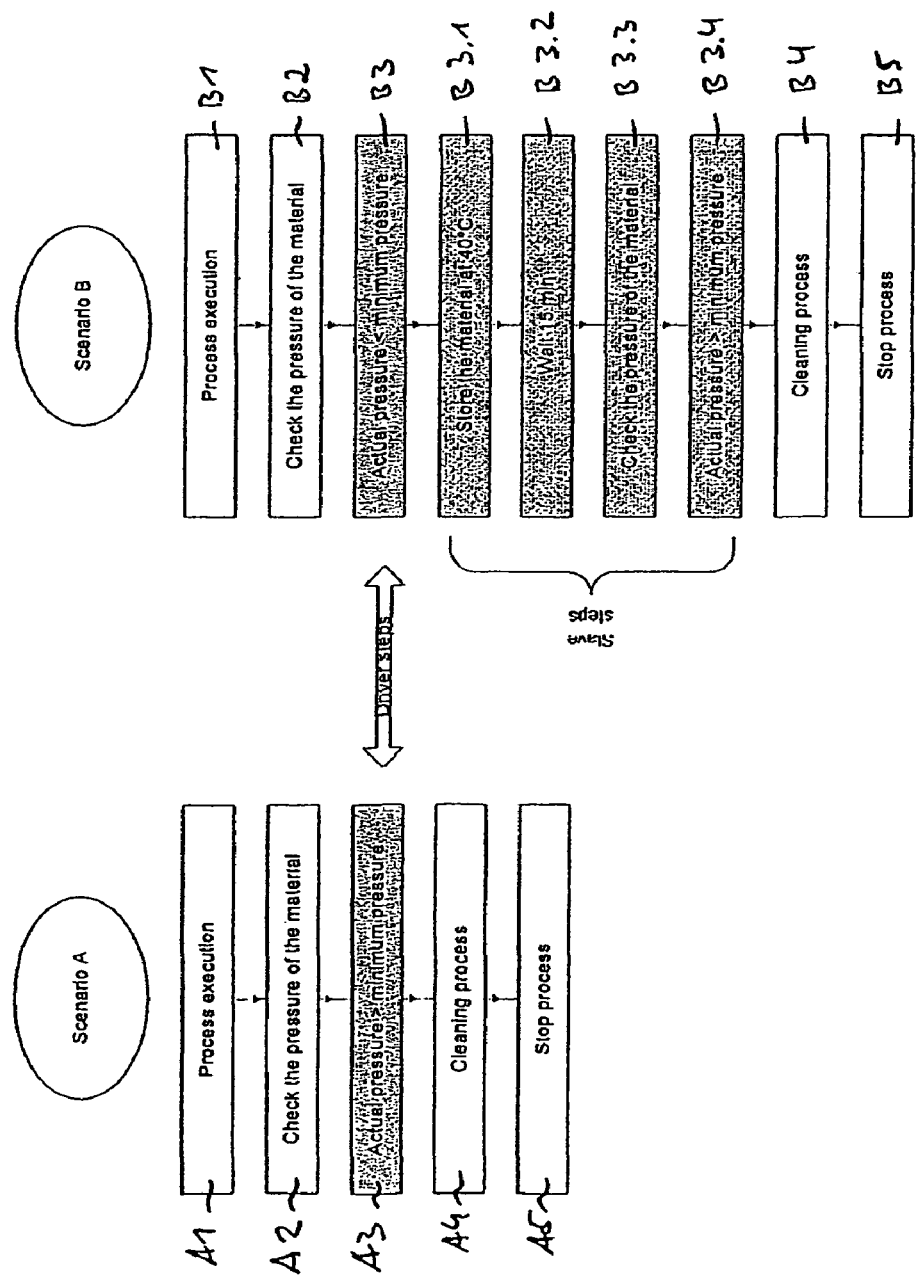
FIG. 11 shows a schematic view of two comparable flow diagrams.

In FIG. 11, as a simple example of a conditional flow, two different scenarios are shown. On the left hand side, scenario A is shown. On the right hand side scenario B is shown. Both scenarios are identical regarding to the chosen process steps. In other words, scenario A and scenario B have identical and/or similar chosen process steps. In particular, in scenario A, in step A1 the process is executed. In step A2 a pressure of a material is checked. In step A3, it is verified that the actual pressure is larger than a minimum pressure. Subsequently, in step A4 a cleaning process is activated and, finally, in step A5 the process is stopped.

Accordingly, in scenario B, in step B1, the process is executed. In step B2, the pressure of the material is checked. In step B3, the actual pressure is indicated as being lower than a minimum pressure. Following that, the slave steps B3.1, B3.2, B3.3 and B3.4 are carried out. In particular, in step B3.1 the material is stored at 40° C. In step B3.2 the expiration of the time period of 50 minutes is waited for. In step B3.3 the pressure of the material is checked and in step B3.4 it is verified that the actual pressure is larger than a minimum pressure. Following that, in step B4 a cleaning process is started and in step B5 the process is stopped.

Formula Insertion:

Formula process steps may be added to a process flow to execute automatic calculation. When the operator adds formula process steps to a master recipe, the system automatically adds all the input process steps related to the formula itself, to create a consistent flow. The relationship between the inputs and the formulas can be contained in a custom external table YPSFORMULA. The system may check the table when a formula is required, and query the table so that a list of related inputs can be retrieve. From this list, additional queries may be performed against the tables YPSINST and YPSIIC, which contain the general data and detailed data of the instances in the repository to extract data related to the inputs of the formula.

Modify a Process Step—Consequences Related to the Conditional or Limits of a Formula:

If a numerical process step is related to a formula or is a driver for a slave process steps group, when changing the possible range of possible values allowed, the system warns the user about the relation with other process steps and asks to check/modify the relationship with other conditional process steps or review the output range of the related formula(s).

As an example, a formula may use two inputs related to the weight of the materials to calculate an average. The first input may have a range of 1 to 10 in some random unit, and the second input may have a range of 1 to 2 in some random unit. The formula may calculate as a result an output range of 1 to 6. If the user needs to change the range of the second input to a range of 1 to 20, in one alternative, the system may prompt the user to verify the calculated output range of 1 to 15. If a user requires a change to a range of possible values for inputs that are used as masters to drive conditional steps the system may warn the user to check the relationship with the conditional process steps.

For instance, if a master process step collects the pressure to apply to the material with an exemplary range 1 to 10 in some random unit and if the actual value is higher than the maximum value, a group of conditional process steps may be added to the flow. Such conditional process steps can, e.g., be dilution of a solution, reducing a temperature, etc. If the user is required to change the range of the master input in, e.g., 9 to 20 in random units, the system warns the user about the relationship with the conditional steps and the relationship can be changed from higher than the maximum to greater that the minimum value.

Drag & Drop Functionality:

The flow may be modified selecting process steps and move the process steps in a different position in the master recipe. Some checks are executed during this action, for instance, the output formula may not be moved before the corresponding inputs and/or the master process step may not be moved below the related conditional process steps.

Deletion of a Process Step:

Process steps may be removed from the Master Recipe in order to modify the process flow. Some checks can be executed by the system: if the selected process step to be removed is an input for a formula the system may deny the action, e.g., after removing the corresponding formula. The same rule may be applied for the master process steps related to one or more conditional process steps. This check is executed performing a query on the YPSFORMULA database that tracks the link between a formula and an input process step. If the input selected is related to a formula, the action is blocked by the system.

Simulation:

The correctness of a master recipe built may be check by using the simulation feature, which allows a user to verify the steps inserted in the process and/or test with data and/or perform formula calculations and/or activate alternative process steps and/or select specific resources, etc. before the use of it in the real production environment. The simulation feature may invoke a process simulator or other logic module provided in the process control system for performing simulations.

Figure 12:
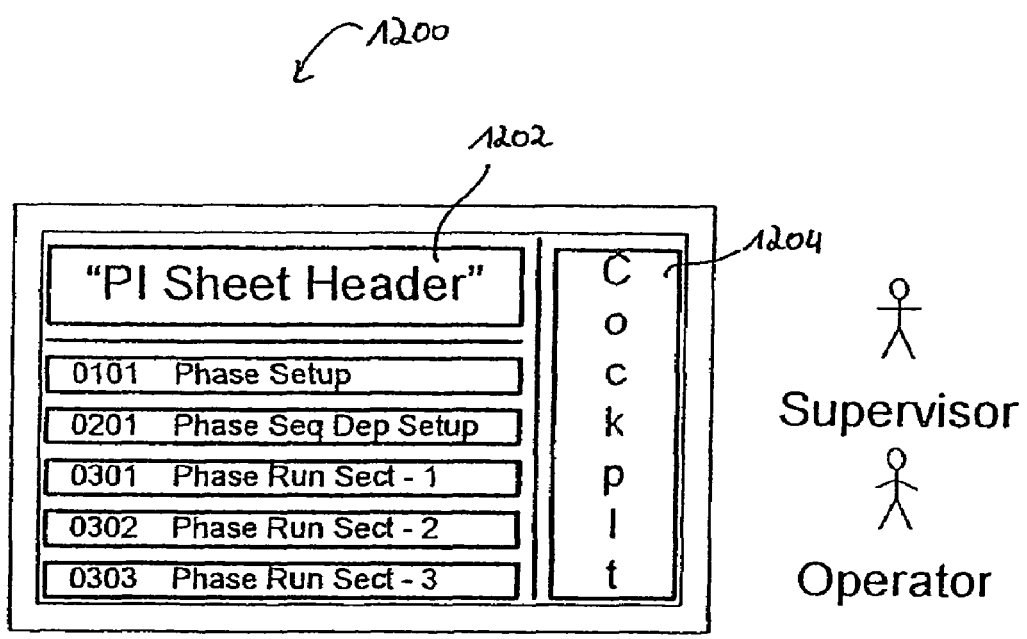
FIG. 12 shows a schematic view of a GUI.
Figure 16:
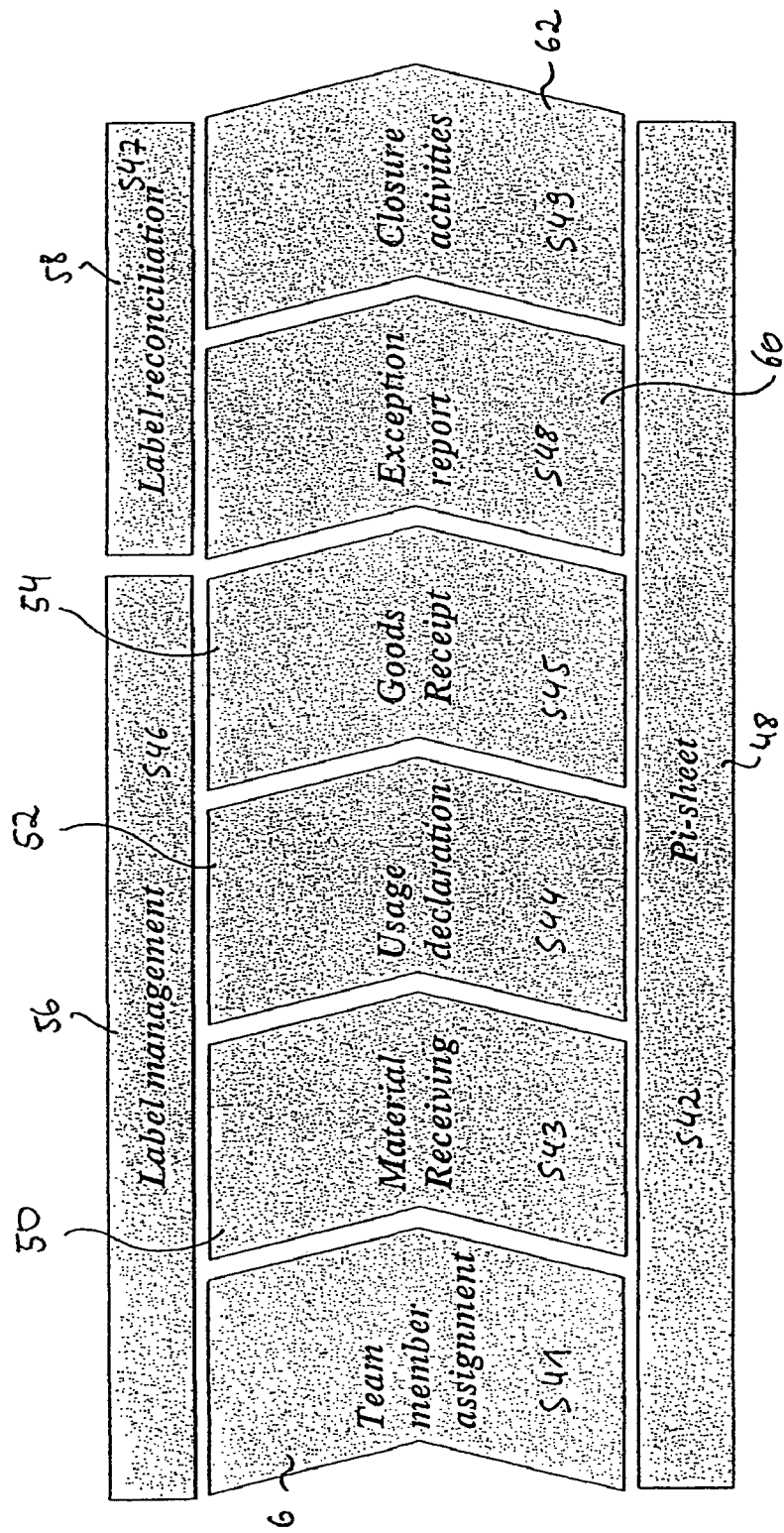
FIG. 16 shows a schematic view of a GUI and/or flow diagram.
Figure 17:
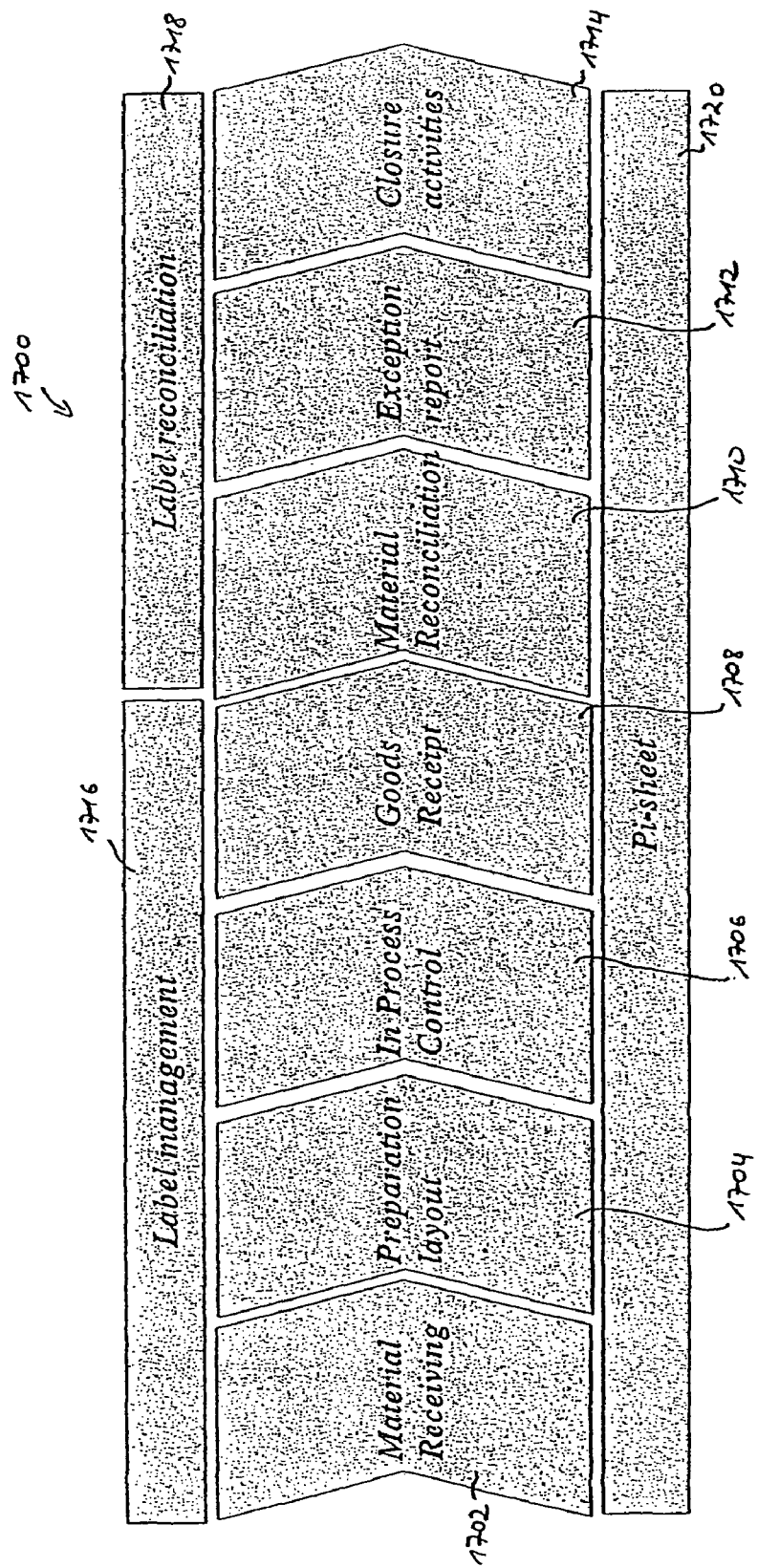
FIG. 17 shows a schematic view of a GUI and/or flow diagram.

FIG. 12 shows an example display of a graphical user interface 1200. As one example, FIG. 12, shows a process instruction sheet header (PI sheet header) 1202, and a list of phases referred to as numerals 0101, 0201, 0301, 0302, and 0303 that may be part of the process instruction sheet. On the right hand side, there is a section referred to as "cockpit" 1204. In one implementation, the "cockpit" 1204 is a frame of the PI-sheet containing a set of custom buttons that allow the user to perform actions and call different custom and standard SAP modules, which provides an integrated environment for the production process. The cockpit frame and the PI-sheet frame may be integrated and communicate through process variables such as the process order number, the material produced, or the phase in which the operator is performing the action the batch generated. These parameters may also be passed to the functions called by the buttons to perform all the steps of the production flow (like the dispensing execution, the material management, the in process control checks, the label management, the sampling process, the time control sheet process, the preparation layout process, the exception management process, the document repository management, the closure checks and so on). The general concept thereof is schematically shown in FIG. 16 and 17.

Figure 13:
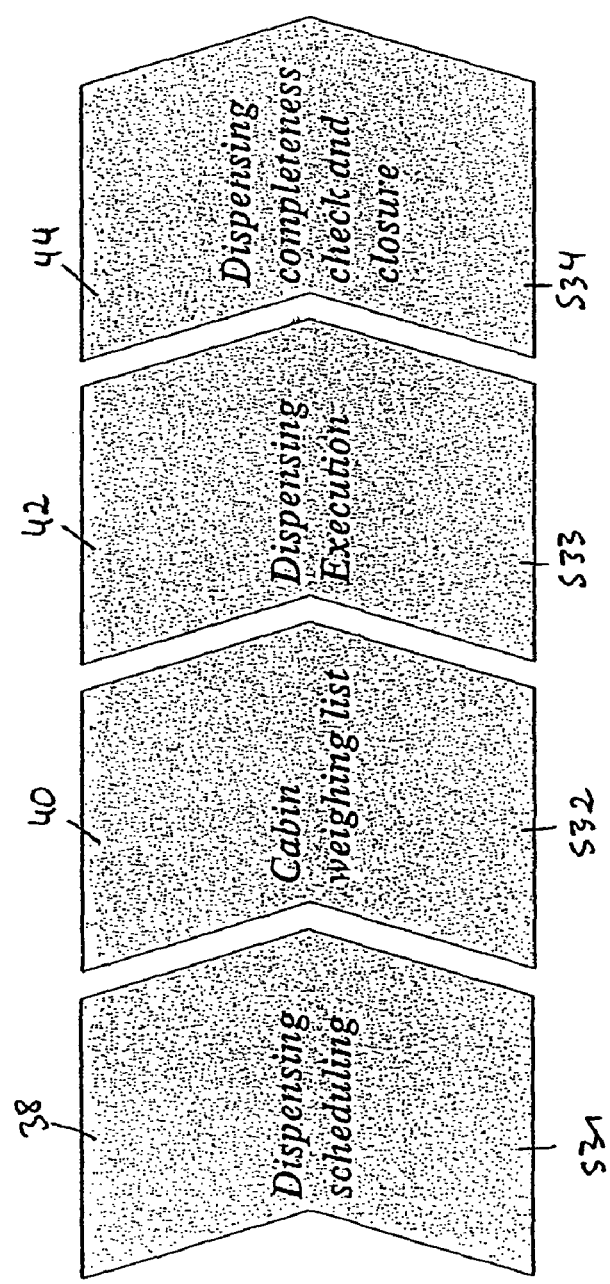
FIG. 13 shows a schematic view of a GUI and/or flow diagram.

FIG. 13 shows steps, which can be carried out during the dispensing management. In other words, FIG. 13 shown as an example of a graphical user interface when button 14 (shown in FIG. 1) is selected and, accordingly, step S3 is carried out. In particular, the dispensing management step S3 includes the steps of dispensing scheduling step S31, cabin weighing list step S32, dispensing execution step S33 and dispensing completeness check disclosure step S34. Similar to FIG. 2, in FIG. 13, the steps are shown. However, FIG. 13 can also represent a graphical user interface having buttons 38, 40, 42, and 44. By selecting one or more of the buttons 38, 40, 42, and 44, the respective steps can be carried out.

FIG. 13 shows, as an example, the blocks used to perform the dispensing process. In one implementation, actual buttons may not be displayed in a GUI. In one implementation, FIG. 13 may represent a flow diagram, showing the steps S31 to S34, which can be carried out automatically, when step S3 is carried out. In other words, steps S31 to S34 may be performed when step S3 in executed. Hence instead of buttons 38 to 44, FIG. 13 may represent logical blocks performed by custom programs. However, when the program is called by the user the buttons may be available to perform their respective functions as mentioned in FIG. 13.

Figure 14:
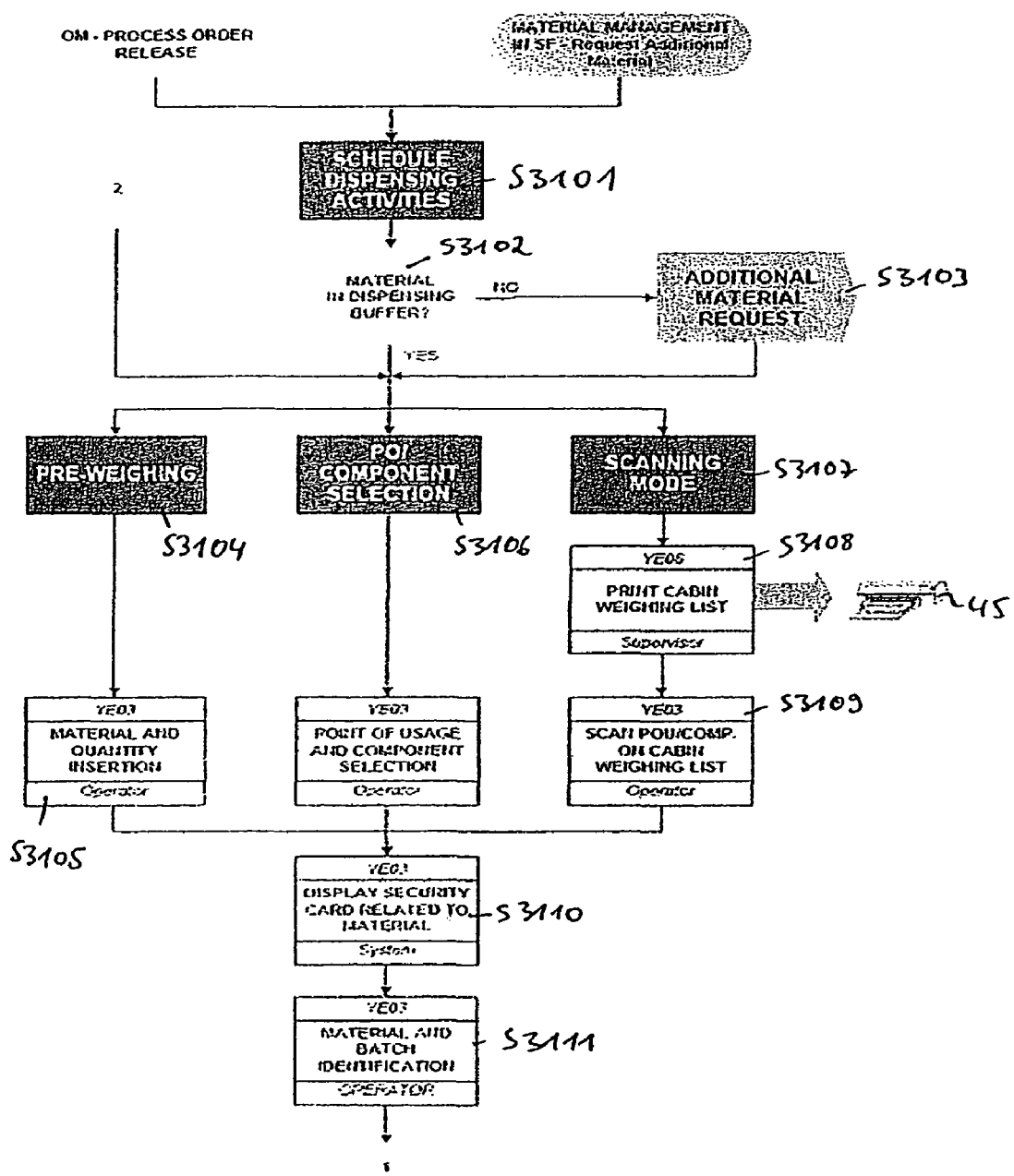
FIG. 14 shows a schematic view of a flow diagram.
Figure 15:
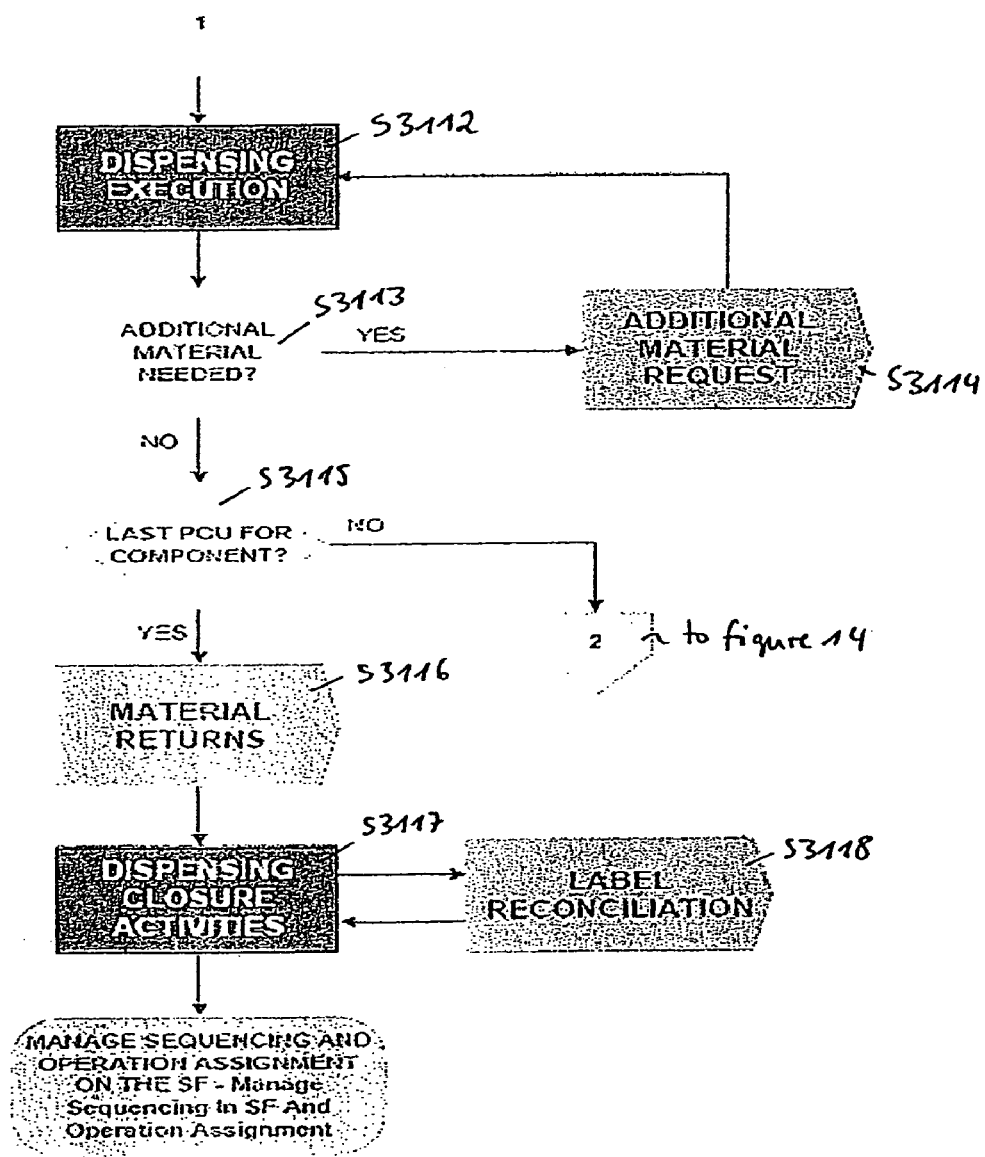
FIG. 15 shows a schematic view of a flow diagram.

In particular, in FIG. 14 and FIG. 15 there is shown a general schema of dispensing process execution according to step S31, as shown in FIG. 13. Particularly, step S31 involves the transaction YE06.

During a first scheduling dispensing activities step S3101, a transaction referred to as transaction YE06 may be executed. Step S3101 may be executed from the process order release, or the additional material request via a custom program defined in the standard system management environment via the custom transaction YE06. In the following step S3102, the material may be defined in dispensing. If the material is not assigned in the master data provided in the standard system management environment, selection of the cabin/location for the dispensing of the process order/material may be required. A "cabin" may be considered a room that contains scales. A "location" may be considered a production area that may contain different cabins. As an example, a location may be a powder zone. In step S3102, if the material is not assigned in the master data the additional material request functionality may be executed in step S3103 and the material is assigned to the first available cabin/location. Otherwise, in step S3102 the material may be assigned as defined in the master data, which may be embedded, or included in the standard system management environment. The master data may be mapped in custom table YECDIS03.

At this point, a check may be executed by the system regarding the existence of the batch, and the shelf life expiration date of the batch. If these checks fail the process may be blocked. Subsequently, one or more of the following steps are carried out:

In a pre-weighing, step S3104, a material is weighted in advance in order to associate to a specific process order. During or as a requirement of the pre-weighing step, the following data may be required for the user to proceed: material code; quantity; and unit of measure. If the data are provided, the inbound batch may be identified by the operator in step S3105 via the custom transaction YE03.

In a PO/component selection step S3106 the row related to the material to use is selected. Step S3106 may be managed by the operator via the custom transaction YE03. During step S3106, the point of usage and the necessary components may be selected.

In a scanning step S3107, e.g., using a paper sheet with a list of materials and corresponding bar codes, a user may acquire the corresponding information directly. The list of materials and the corresponding bar codes may be obtained using a conventional printer 45. The supervisor user may acquire the list by executing the function "Print cabin weighing list" during step S3108 from the YE06 transaction.

The bar-code is read by a scanner during step S3109, thereby allowing the user to directly acquire the corresponding information (e.g., material code, quantity, and process order number) into the system. Using the data, the operator may execute a query against a custom database via YE03 transaction to perform the dispensing activity. Alternatively, the scanning step may be referred to as scanning mode.

In step S3110, a security card may display a notice to the user regarding how to manage or handle the material, e.g., requiring users to wear masks when handling the material, or a warning to handle the material with care. Further to that, security information may be displayed to the user. The system may automatically display the information to the user during transaction YE03.

During step S3111, as shown in FIG. 15, the operator at this point may perform the material and batch identification via the custom transaction YE03. The identification may be performed via manual acquisition, or via bar-code readers. The material and batch identification activity is the starting point of the dispensing execution.

Before proceeding to the next step, the system may check the batch status and the corresponding expiration date. If the lot has expired or does not have the correct status, in particular, if the batch is quarantined or not to be dispensed, execution is blocked. The batch status and corresponding expiration date are stored into conventional tables of the standard system management environment. If the standard system management environment is an SAP environment, for example, the information may be retrieved into standard SAP tables MCHA, MCHB and classification of batch.

Next, dispensing execution step S3112 is carried out. From the main screen called from transaction YE03, the user is able to input data into the system (e.g., a material code, a batch code, or a quantity to weigh). For example, the value ranges defined for a specific scale may need to be considered when inputting the quantity value to weigh. The tolerance declared by the manufacturer of the scale may be mapped in a custom table. As an example, for a scale with range 0-10 kg the error declared may be 0.05 g.

Following the tolerance checks, as described above, each weight may be stored in custom table(s), such as YECDIS02, and the header information may be stored in the custom table YECDIS01. The weight may be acquired manually or automatically if the scale is interfaced with the system. In the current example a fragment (bag) of material is defined.

In step S3113, whether a fragment is missing and/or broken, and whether additional material is required by the system for the process are verified. In the affirmative, the "Additional material request" step S3114 is performed, and a transfer order is generated within the system directed to the warehouse. The transfer order may be provided automatically.

In step S3115, a check is executed on the system to determine whether the last point of usage is reached. In the affirmative, return of the remaining material to the warehouse in step S3116 may be requested or executed. The last point may be a specific position on the production flow, such as the operation and phase into the process order. The return of the remaining material may be carried out by the material return function.

If the last point of usage has not been reached, one or more of steps S3104, S3106 and S3107 and the respective subsequent step(s) may be carried out, as shown in FIG. 14.

During a dispensing closure activities step S3117, via the YE06 transaction, all the materials for a specific process order may be dispensed for the operation/location.

During an order closure step, a check of the dispensing execution of each fragment may be performed. A flag may be set in table YECDIS02 for each fragment registered. The check of each fragment may include the acquisition of data printed on the label(s) of each fragment, e.g., reading a barcode with a barcode reader.

During a label reconciliation step S3118, preferably all the printed labels are checked by the system. In particular, it is checked, whether some labels are lost, reprinted, or deleted due to fragments discarded.

FIG. 16, an example, shows a case where button 16 is selected/activated in FIG. 1. In other words, FIG. 16 shows a graphical user interface, in case step S4 is carried out. In the display, different buttons 46 to 62 are shown. According to the before-mentioned FIGS. 2 and 13, the buttons can also represent process steps S41 to S49.

In particular, when selecting button 46 process step S41 is carried out. The process step S41 is referred to as team member assignment step S41. Process step S41 provides functionality to maintain the qualification grants of the operators to allow operators to perform the system activities on the process order and/or resource selected. Further, the information related to the training attended by the operators is retrieved by a specific interface and checked at the user log on. In case of missing qualification, the system requires a specific authorization from the supervisor, together with an explanatory comment, in order to finalise the assignment. Following that, it is not necessary to select button 46 in order to carry out the entire or parts of the member assignment according to step S41. Rather, some or all of the functions of step S41 can be carried out automatically, in case step S4 is carried out. Moreover, button 48 can refer to a process instruction sheet. In particular, the production execution is driven by the process steps S42. These steps, defined in the master recipe, are arranged in a control recipe, which is presented to a user as a web-based process instruction sheet (PI-sheet) integrated with the process manufacturing cockpit. During step S42 the PI-sheet is displayed in the graphical user interface, as one implementation of a visualization of a usability layer. The display is carried out by selecting button 48.

The PI sheet, in the example shown in FIG. 12, is logically divided in a structure that the following levels: Operation, sections, phases and process steps.

A section is a group of phases that perform similar tasks from a process prospective. As an example, a section can be a set-up section, or a run section.

The PI sheet shows the user or the process steps defined for the actual resource on which the operation is processed. Using the cockpit, as shown in FIG. 12, the PI sheet is linked to several built-in functionalities.

In step S43, which is carried out by selecting button 50, material receiving is executed. When reserved materials are delivered in a production for a specific operation, the material receiving has to be executed in order to start a production.

When materials have been received, a production operator identifies component and lot codes related to the process order and operation in process.

During the materials receiving information, the operator identifies dispensed fragments and intermediates staged for the production. The materials are identified, checked and the consumption is posted.

In step S44, which is executed by selecting button 52, a usage declaration process is carried out. The usage of each material per point of usage has to be declared. In particular, the operator has to declare the usage of each material required in each point of usage, by identifying the fragment received. Further, the operator has to declare the quantity of material to be dispensed in production.

The usage declaration function is called directly from the PI sheet, when required by the phase in process. It is performed for process or for specific phases.

During step S45 referred to as goods receipt step S45, which may be executed by selecting button 54, the operator is allowed to declare the quantity produced. The quantity declared by the user is posted in stock, and the goods receipt phase is confirmed using background functions. Further, goods receipt labels are printed automatically when saving. The goods receipt history is maintained and can be acquired by the same screen/graphical user interface. Next, steps S46 and S47 are carried out, by selecting buttons 56 and 58. During steps S46 and S47, labels are printed by manual and/or automatic trigger during the production activities. As an example, such a label can be a resource label, HFG container label, material return label, sample label etc. The labels reprinting can be performed by accessing to the dedicated transactions.

The label reconciliation manages the information related to the printed, reprinted and scrapped labels in order to double check the data inserted. Next, in step S48, which is executed by selecting button 60, the exception report functionality is carried out. The functionality captures all comments and events for the batch in process, storing information about the deviation triggers, data, time and signature.

In particular, supervisors and/or quality assurance ("QA") review is tracked and additional comments are collected.

At the end of the process, in order to execute the closure, the supervisor has to call the report and verify all the posted comments. Finally, step S49 is carried out by selecting button 62. In step S49, closure activities are carried out. In particular, at the end of all before-mentioned activities related to an operation of a PI sheet, a process instruction requires to call the closure checks report in order to verify the correct execution of activities.

The system performs checks on the process completion and returns the results in the report.

At saving the system requires to enter machine and labour time or requires the data correctly from the interfaces (e.g. from an external production reporting system referred to as "PRS").

At the closure saving the system confirm the operation and/or order, close the PI sheet, the technically completed (referred to as "TECO") status using background functions.

Following that, the manufacturing execution management step S4 is finished. The before-mentioned steps S41 to S49 can be carried out manually by selecting one or more of the buttons 46 to 62. However, some or all of the steps S41 to S49 may be carried out automatically. In particular, some or all of the before-mentioned steps S41 to S49 are carried out subsequently automatically by the system.

FIG. 17 shows an exemplary graphical user interface 1700 that may be displayed when step S5 is carried out. In particular, the exemplary graphical user interface 1700 can be displayed when selecting button 18 from FIG. 1. In particular, step S5 can have the steps material receiving, preparation layout, in process control, goods receipt, material reconciliation, exceptional report and close activities. Additionally, the step label management and label reconciliation may be included and a step/activity referred to as "PI sheet" Is possible. Alternatively, the graphical user interface can have the respective buttons, as similarly described with respect to FIGS. 1, 2, 13 and 16. In other words, the graphical user interface 1700 displays interface elements such as buttons that activate or otherwise control process steps or elements that report on the progress or status of control process steps. In FIG. 17, the interface elements are shown as a steps material receiving element 1702, a preparation layout element 1704, an in process control element 1706, a goods receipt element 1708, a material reconciliation element 1710, and an exceptional report and close activities element 1712. Additionally, the graphical user interface 1700 may include a step label management element 1716 and a label reconciliation element 1718 as well as a step/activity reference label 1720 to the "PI sheet".

In particular, preparation layout may include a information that can be displayed by the production user in order to get information about the data to be printed on the blister and a box of the finished product. Box and blister layout and variable data maintained in the recipe material and batch master can be shown in the report. Once printed, the report can be extracted again to be displayed and reprinted during the process. In other words, preparation layout can be executed by selecting the respective button, as shown in FIG. 17. Step operation layout can also be executed automatically, when executing step S5.

Further to that, the step in process control can allow to record the results of the in process control (in the following referred to as "IPC") in the IPC execution.

During the execution of the IPC, the system records the results in the inspection lot. The IPC execution is reachable from the proper button in the cockpit, as exemplary shown in FIG. 12. The functionality can allow the user to fill, evaluate and complete the IPC that are active for the current inspection point. Further, at any point of the process, the system may retrieve all the information regarding the IPC of any inspection point. The user/operator may access this functionality by the selecting the proper button in the cockpit.

Figure 18:
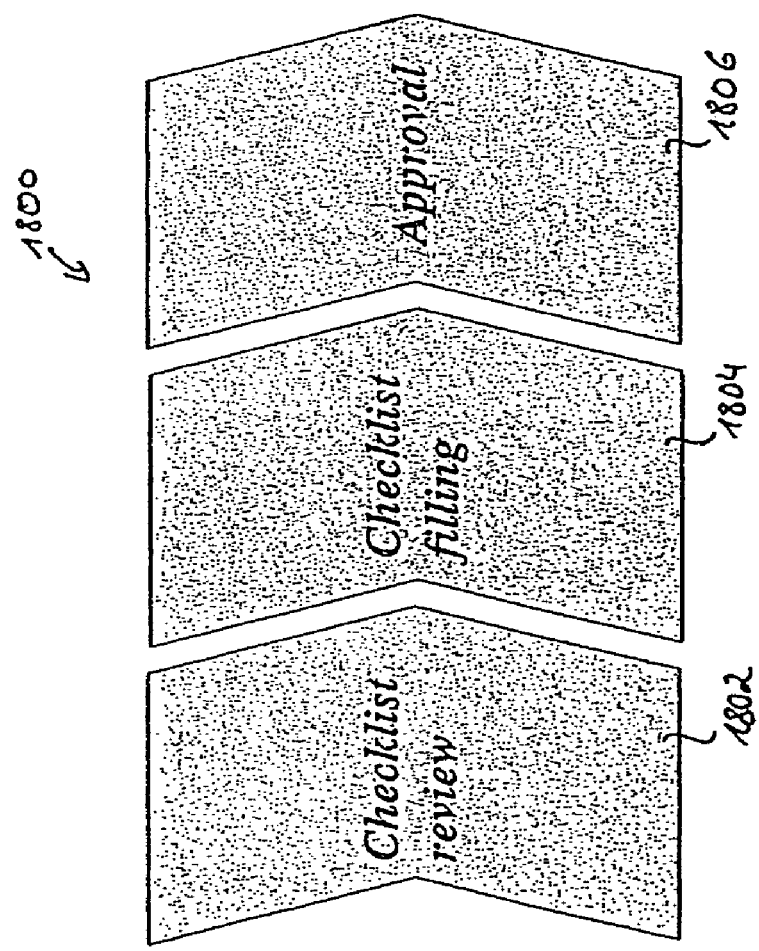
FIG. 18 shows a schematic view of a GUI and/or flow diagram.

FIG. 18 shows a possible graphical user interface 1800 which can be displayed during step S6. In other words, the graphical user interface 1800 according to FIG. 18 can be displayed when selecting button 20 in FIG. 1. In particular, the batch review and disposition step may include a check list review step, a check list filling step and an approval step. In the check list review step and filling step, the batch disposition process may start after the relevant process order ("PO") has been closed in the system. The batch record archiving is triggered and performed in the background. Using dynamic checks and the link to the PI sheet, the QA operator may display directly the data saved by the production operators. By reviewing the check list, the operator may evaluate the items and declare the conformity. Also, an automatic proposal by the system may be triggered.

In particular, the steps can be carried out by selecting the respective button, as shown in FIG. 18, however, the steps can also be carried out automatically. In other words, the graphical user interface 1800 may display interface elements such as buttons that activate or otherwise control the steps or elements that report on the progress or status of the steps. In FIG. 18, the interface elements are shown as a checklist review element 1802, a checklist filing element 1804, and an approval element 1806.

During the approval step, by managing specific user statuses, functionality can allow the usage decision definition on the produced batch. In particular, different approval levels can be managed to proceed with two step control on the batch. Further to that, a check can be performed at saving: The batch cannot be approved if at least one component batch has been rejected. When the QA saves the approval, the second version of the batch recording is approved and archived.

Figure 19:
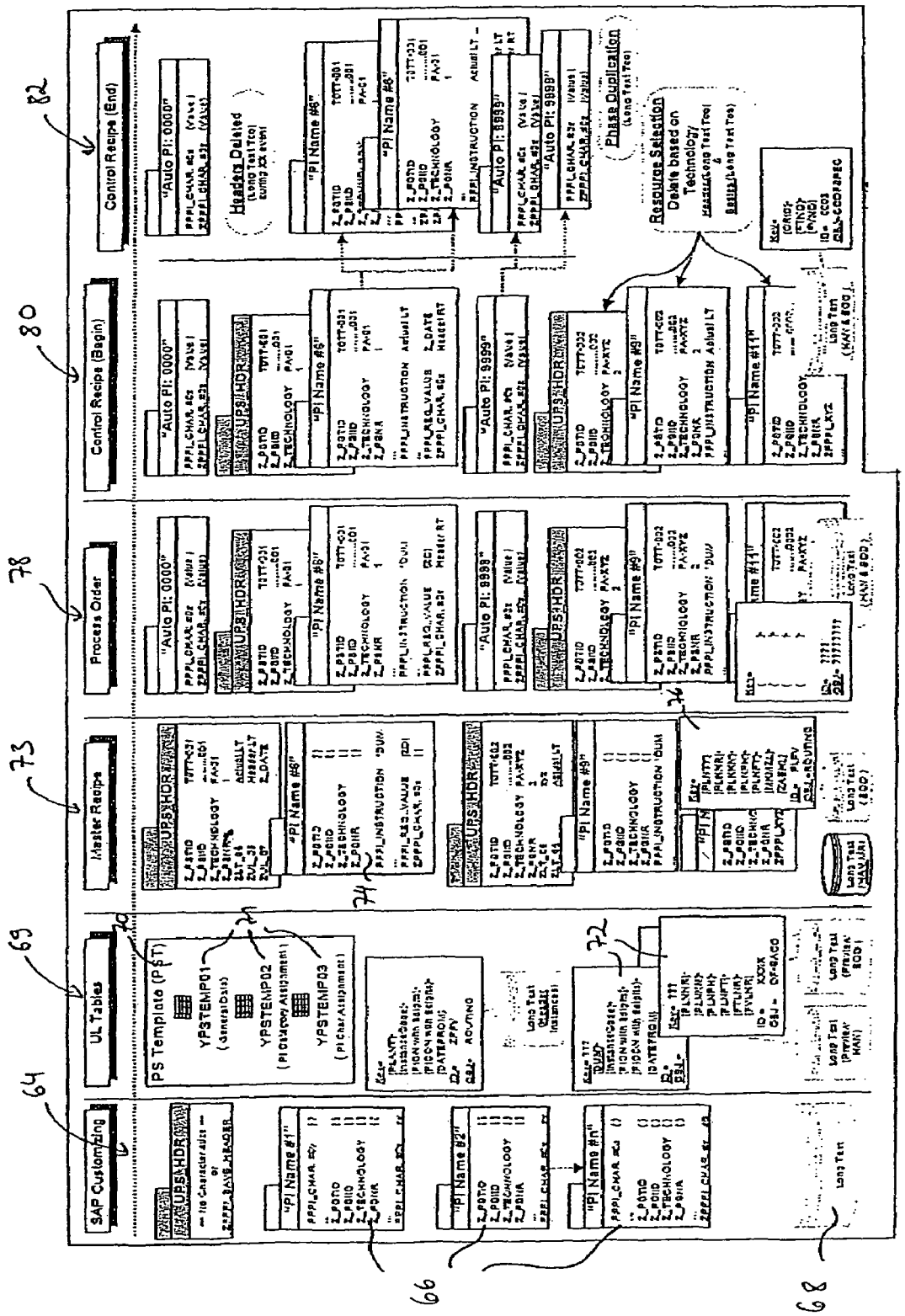
FIG. 19 shows a schematic overview.

FIG. 19 shows a schematic overview of one implementation of the process control system. In particular, in FIG. 19 there are shown process instructions. As an example, in column 64 specific process instructions are shown. Characteristics and the process instructions may be defined. As an example, a sequence of characteristics that allow a user to define a simple instruction in a PI sheet may be provided. Standard processes can be used to build a custom instruction and/or logic. Custom process instructions 66 are exemplary shown. Custom process instructions can have defined custom characteristics, such as "ZPPPI_SAVE_HEADER", "Z_PS-TID", "Z_PSNR", etc. The custom process instructions can be referred to as "PI_NAME#1", "PI_NAME#2", etc. The custom characteristics in the custom process instructions can allow advanced instructions in the PI sheet, such as conditional flows, automatic execution of formulas, deviations and input insertions and so on. In other words, process instructions 66, which can be tables, can be used in the flow, as shown in FIG. 4.

Further to that, long text 68 is indicated in FIG. 19. Long text 68 can contain description and/or text to be followed by the operators, when a specific process instruction is carried out. In other words, some process instructions 66 can contain descriptions to be followed by the operators. Long text 68 may be included in a standard table in SAP.

Furthermore, process templates 70 are shown. The process templates 70 may include process instructions structure and logic definitions. The process step template 70 may include reference tables 71. The reference tables are exemplary named: "YPSTEMP01", "YPSTEMP02", "YPSTEMP03". The reference tables 71 can contain the mapping of the process instructions defined in the before-mentioned SAP customising, allowed values and logic control. Further to that, structure and databases/tables 72 can be provided, which are used for the management of the long text instructions. Further, a master recipe section 73 is shown.

Additionally, in a master recipe section, instructions 74 can be provided which are filled with the usability tool, particularly having a graphical user interface as described above. Each process step may be divided into:

a header containing data referred to as "UPS_HDR"; and
a body containing logic referred to as "PI NAME#".

Also, corresponding fields 76 of standard SAP tables containing the custom instructions inserted, can be provided. In the process order section the creation of the process order from the master recipe is described. A process order describes the production of batches, such as materials, in a production run or the rendering of the services. It is generated from the master recipe and contains all the information specified during the process planning. Further, a process order section 78 is shown.

In one implementation, the control recipe (begin) section 80 provides for the creation of the control recipe from the process order. A standard process may be combined with a system. Using control recipes, control data can be transferred from the process order to process control. The user defines the information contained in the control recipe, and specifies where the information is sent in the process control.

The custom control recipe creation process is based on filling the data process step ("UPS_HDR") to the body (the "PI_NAME#" process steps logic), which results in the data being combined with the logic to create instructions to be used during the production control.

In a control recipe (end) section 82 the control recipes are sent and the PI sheet is generated. The PI sheet presents the result of a control recipe that was sent to a process operator and whose content is displayed as text on the screen. This means the PI sheet is an instruction for the process operator that describes how and in which order a product is manufactured. The PI sheet can, for example, contain information about the picking of raw materials as well as instructions about charging the mixer, filling silos and so on.

Further to that, the PI sheet contains information, such as instructions and logic, created in SAP, personalized in the repository and inserted in the master recipe via the usability layer.

Figure 20:
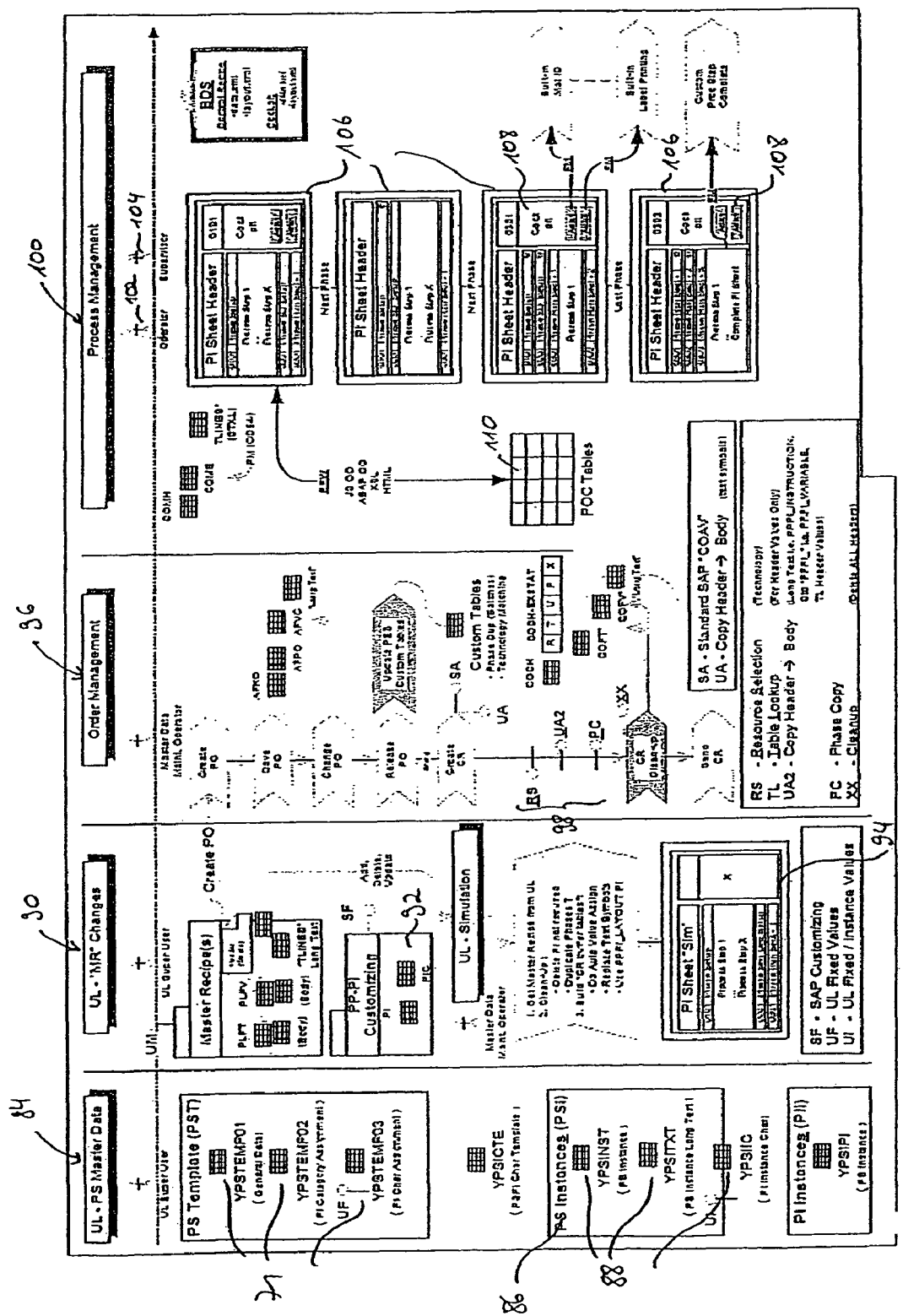
FIG. 20 shows a schematic overview.

FIG. 20 shows an overview of the control recipe events in particular, from the master data management to the process management. FIG. 20 also shows a usability layer process step master data section 84. In the usability layer process step master data section 84, the master data user may create process instructions that may be employed by and made available to other kinds of processes accessible through the usability layer tool. The basic process instructions are defined in an SAP environment and mapped in custom tables, such as tables 71 shown as an example in FIG. 19. The custom tables 71, in one implementation, are managed by the usability layer to execute the logic control. Created process instructions may be stored in a custom repository 86 based on a set of custom data base tables 88.

A usability layer master recipe changes section 90 is provided in one implementation of the process control system. In the usability master recipe changes section 90, the user may assign process instructions previously defined to a specific master recipe via the usability layer. Accordingly, the user may build the flow logic and control the process. Process instructions, referred to in FIG. 20 as numeral 92, inserted in the master recipe, may be stored in custom external tables of a standard system management environment (e.g., standard SAP tables) for use in subsequent steps of processing. In one implementation, the behaviour of the process may be simulated. In particular, the defined process based on the combination of process instructions 92 and each control defined inside can be tested before the release of the master recipe for the generation of the process order for the management of the real process. In one implementation of the usability layer—master recipe changes section 90, the simulation is shown by a schematic cockpit 94. The cockpit 94 is a schematic view of a graphical user interface provided to the user.

FIG. 20 also shows an example of an order management section 96. In the order management 96, after testing the correct behaviour of the flow and the controls, the process order is created from the master recipe. In particular, all the data are combined with the logic to allow the generation of the control recipe, which is not provided in a standard SAP environment. Rather, in a standard SAP environment for every change of data, the logic, including parts of the source code (of templates) have to be customized/adapted by a software engineer or a person with specific technical expertise regard such customizations.

Moreover, elaboration steps 98 of the process order are shown, which are allow a generation of the control recipe and the PI sheet. Finally, a process management section 100 is shown. In the process management section 100 production operators 102 and supervisors 104 are exemplary shown. The production operators 102 and supervisors 104 can use the PI sheet 106 interacting with a cockpit 108 to communicate with a wide set of custom (external) and/or standard (i.e., integrated) functionalities that cover the whole production process. All the data generated by the system and inserted by the users are stored in custom external tables, and/or standard internal tables 110 for the next steps of the process e.g., the batch disposition and archiving process.

The cockpit section 108 of the PI sheet 106 is adapted for the collection of the built-in features and for calling all the integrated functionalities that are allowed uses to manage the whole process.

Regarding to FIG. 20 the following terms and/or abbreviations have been used:

UL Master Data—Master Data Operator

Creation of Process step templates in a standard system management environment, such as standard SAP (table reference PS Template)—manual activity using the standard system management environment, such as the standard SAP and using custom logic.

The user input may include: definition of logic inside customizing SAP.

The system output may include: definition of Process step templates.

Creation of instances in repository (table reference PS Instances)—manual activity using custom graphic tool, in particular using a GUI of a UL.

The user input may include: values inside templates.

The system output may include: repository generation.

UL "MR" Changes—Master Data Operator

Insertion of instances inside master recipes—manual activity using custom graphic tool in particular using a GUI of a UL.

The user input may include: filling instructions inside master recipe.

The system output may include: master recipe definition.

The simulation of the recipe, in one implementation of the process control system, may perform automatic activities using custom graphic tools, e.g., a GUI of a UL.

The user input may include: master recipe code/transaction execution.

The system output may include: master recipe simulation.

Order Management—Operator and Supervisor

Order Management: creation of the order and PI-Sheet—automatic activity using standard and custom graphic tool, in particular using a GUI of a UL.

The user input may include: basic data through standard SAP transaction to create a process order.

The system output may include: process order creation; control recipe creation.

Process Management—Operator and Supervisor

Process Management—generation of PI-Sheet—automatic activity using standard and custom graphic tool, in particular using a GUI of a UL.

The user input may include: selection of process order.

The system output may include: PI-Sheet for the production.

In particular regarding to FIG. 19 the following terms and/or abbreviations have been used:

SAP Customizing

Creation of Templates in SAP—manual activity using standard SAP and using custom logic.

The user input may include: definition of logic inside SAP customizing.

The system output may include: definition of Process step templates.

UL Templates—Master Data Operator

Definition of the Database for the management of the template and logic implementation—custom database.

The user input may include: definition of relationship between the SAP customizing and custom templates and logic control.

The system output may include: automatic checks on process instructions.

Master Recipe—Master Data Operator

Standard structure filled with custom process steps via Usability Layer—as a custom tool.

The user input may include: filling instructions inside master recipe.

The system output may include: master recipe definition.

Process Order—Operator and Supervisor

Creation of the order and PI-Sheet—automatic activity using standard and custom graphic tool, in particular using a UL.

The user input may include: selection of process order.

The system output may include: control recipe availability for the production.

Control Recipe (Begin/End)—Operator and Supervisor

PI-Sheet usage in the production environment

The user input may include: selection of process order and operation.

The system output may include: PI-Sheet for the production.

Figure 21:
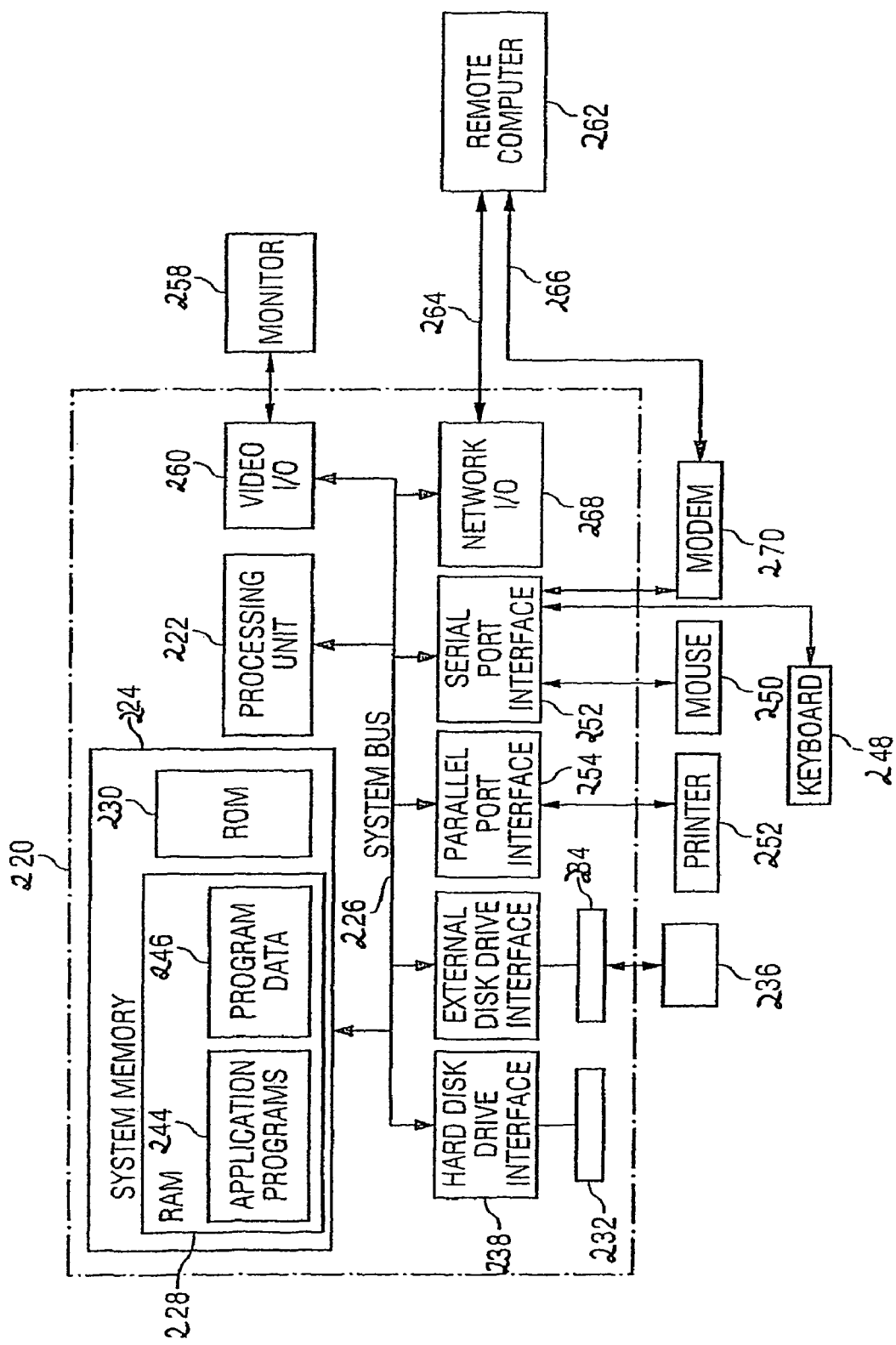
FIG. 21 shows a schematic overview of system components of a data processing device.

With reference to FIG. 21, an exemplary system for implementing the process control system includes a computing environment 220 (e.g., personal computer), including a processing unit 222, a system memory 224, and a system bus 226, that couples various system components including the system memory 224 to the processing unit 222. The processing unit 222 may perform arithmetic, logic and/or control operations by accessing system memory 224. The system memory 224 may store information and/or instructions for use in combination with processing unit 222. The system memory 224 may include volatile and non-volatile memory, such as random access memory (RAM) 228 and read only memory (ROM) 230. A basic input/output system (BIOS) containing the basic routines that helps to transfer information between elements within the personal computer 220, such as during start-up, may be stored in ROM 230. The system bus 226 may be any of several types of bus structures including a memory bus or memory controller, a peripheral bus, and a local bus using any of a variety of bus architectures.

The personal computer 220 may further include a hard disk drive 232 for reading from and writing to a hard disk (not shown), and an external disk drive 234 for reading from or writing to a removable disk 236. The removable disk may be a magnetic disk for a magnetic disk driver or an optical disk such as a CD ROM for an optical disk drive. The hard disk drive 234 and external disk drive 234 are connected to the system bus 226 by a hard disk drive interface 238 and an external disk drive interface 240, respectively. The drives and their associated computer-readable media provide non-volatile storage of computer readable instructions, data structures, program modules and other data for the personal computer 220. The data structures may include relevant data of the implementation of the method for controlling and/or monitoring, as described in more details above. The relevant data may be organized in a database, for example a relational or object database.

Although the exemplary environment described herein employs a hard disk (not shown) and an external disk 242, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 242, ROM 230 or RAM 228, including an operating system, one or more application programs 244, other program modules, and program data 246. The application programs may include at least a part of the functionality as detailed in FIGS. 2 to 22.

A user may enter commands and information, as discussed below, into the personal computer 220 through input devices such as keyboard 248 and mouse 250. Other input devices may include a microphone (or other sensors), joystick, game pad, scanner, or the like. These and other input devices may be connected to the processing unit 222 through a serial port interface 252 that is coupled to the system bus 226, or may be collected by other interfaces, such as a parallel port interface 254, game port or a universal serial bus (USB). Further, information may be printed using printer 256. The printer 256, and other parallel input/output devices may be connected to the processing unit 222 through parallel port interface 254. A monitor 258 or other type of display device is also connected to the system bus 226 via an interface, such as a video input/output 260. In addition to the monitor, computing environment 220 may include other peripheral output devices (not shown), such as speakers or other audible output.

The computing environment 220 may communicate with other electronic devices such as a computer, telephone (wired or wireless), personal digital assistant, television, or the like. To communicate, the computer environment 220 may operate in a networked environment using connections to one or more electronic devices. FIG. 21 depicts the computer environment networked with remote computer 262. The remote computer 262 may be another computing environment such as a server, a router, a network PC, a peer device or other common network node, and may include many or all of the elements described above relative to the computing environment 220. The logical connections depicted in FIG. 21 include a local area network (LAN) 264 and a wide area network (WAN)

266. Such networking environments are commonplace in offices, enterprise-wide computer networks, intranets and the Internet.

When used in a LAN networking environment, the computing environment 220 may be connected to the LAN 264 through a network I/O 268. When used in a WAN networking environment, the computing environment 220 may include a modem 270 or other means for establishing communications over the WAN 266. The modem 270, which may be internal or external to computing environment 220, is connected to the system bus 226 via the serial port interface 252. In a networked environment, program modules depicted relative to the computing environment 220, or portions thereof, may be stored in a remote memory storage device resident on or accessible to remote computer 262. Furthermore other data relevant to the application of the insurance claim management evaluation method (described in more detail further below) may be resident on or accessible via the remote computer 262. The data may be stored for example in an object or a relation database. It will be appreciated that the network connections shown are exemplary, and other means of establishing a communications link between the electronic devices may be used.

Figure 22:
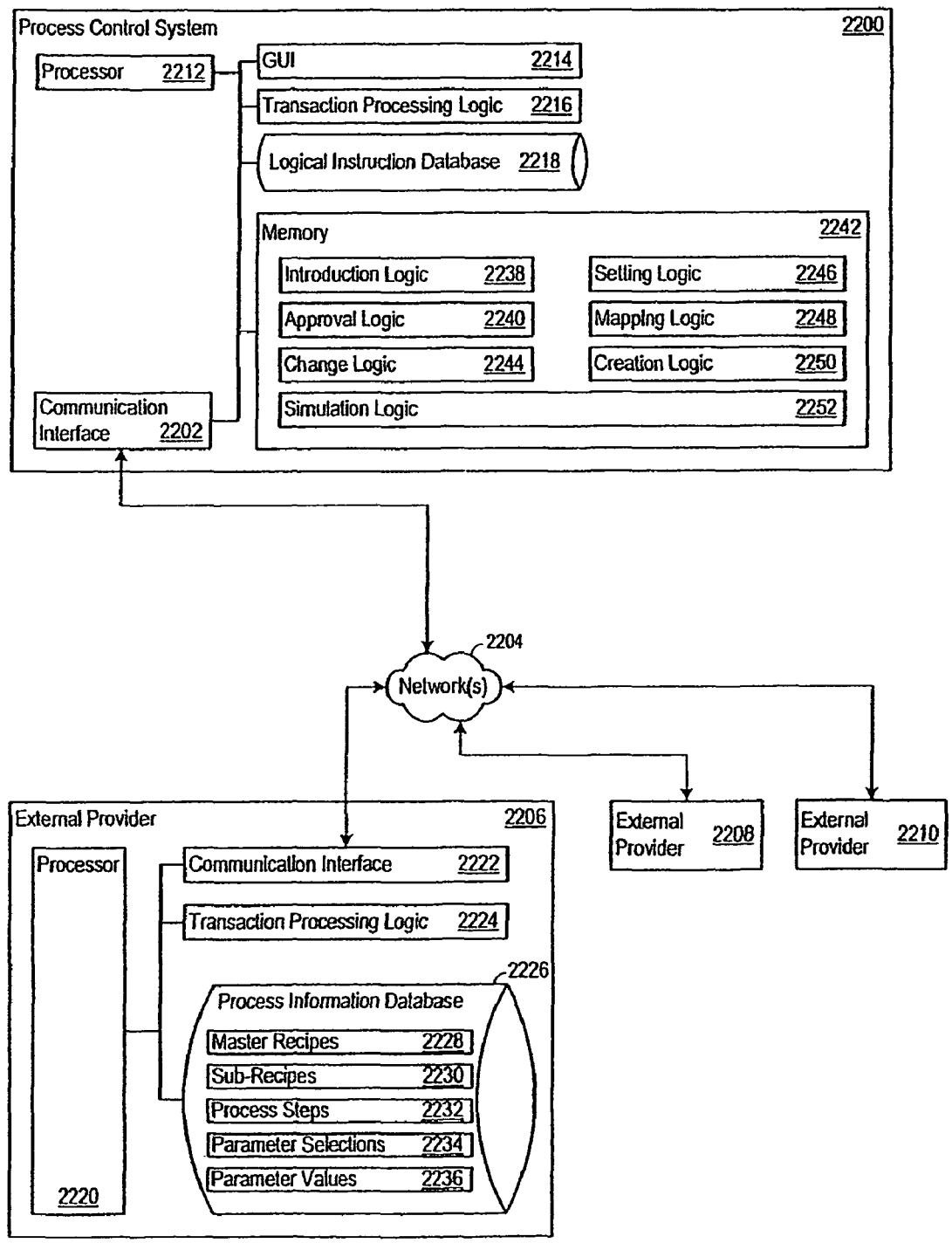
FIG. 22 shows a process control system that communicates with an external provider of logical instruction steps.

FIG. 22 shows a process control system 2200, including a communication interface 2202 connected to a network 2204. The process control system 2200 communicates over the network 2204 with external providers of process information, including external logical instructions, for process control. FIG. 22 shows three such external providers 2206, 2208, and 2210, however, there may be any number of external providers.

The process control system 2200 includes a processor 2212, a GUI 2214, and transaction processing logic 2216. The logical instruction database 2218 stores the logical instructions that specify operations for drug manufacture, dispensing, or other process control tasks. The GUI 2214 may provide a graphical interface for the operator, through which the operator selects, specifies, purchases, or otherwise requisitions external logical instruction steps for the process control system 2200. To that end, the GUI 2214 may display process information available from the external providers (e.g., through a web browser/html rendering interface) and the transaction processing logic 2216 may include order acceptance, validation, and transmission hardware and/or software. The transaction processing logic 2216 may, for example, include instructions that communicate an order for new logical instruction steps (e.g., a new master recipe for a drug) from the external provider 2206.

The external provider 2206 includes a processor 2220 interconnected with a communication interface 2222, transaction processing logic 2224, and a process information database 2226. The external provider 2206 maintains the process information database 2226 as a local repository of master recipes 2228, sub-processes or recipes 2230, individual process steps 2232, other logical instruction steps, parameter selections 2234, parameter values 2236, and other process information. The external provider 2206 may represent, for example, an independent research agency that researches, develops, and refines drug manufacturing processes, or an electronic storefront for such information.

In other words, the external providers 2206, 2208, and 2210 may commercialize process information. In the example shown in FIG. 22, the external provider 2206 offers the process information for sale across the network 2204. The transaction processing logic 2224 at the external provider 2206 may support the commercialization of the process information by implementing order acceptance, validation, and process information delivery hardware and/or software. For example, the transaction processing logic 2224 may implement purchaser authentication and authorization logic, and credit card, wire transfer, and purchase account debiting logic across a secure socket layer or other encrypted or protected communication channel. The transaction processing logic 2224 may also implement communication logic that retrieves the purchased process information from the process information database 2226 and that send the purchased process information through the network 2204 to the process control system 2202.

The process control system 2202 receives the purchased process information from the external provider 2206. As noted above, the process control system 2202 may then introduce the process information into the existing process management environment. As one example, the process control system 2202 may map the received process information into an existing master recipe for a drug. As another example, the process control system 2202 may set process parameters according to the purchased parameter values obtained from the external provider 2206.

FIG. 22 also shows that the process control system 2200 includes introduction logic 2238 and approval logic 2240. In the example shown in FIG. 22, the introduction logic 2238 and the approval logic 2240 are programs that the processor 2212 executes from the memory 2242. The processor 2212 may serve as an overall process controller that controls the process according to the external process information, using the resources of the existing process management environment.

The introduction logic 2238 may introduce the external process information into the existing process management environment. For example, the introduction logic 2238 may include instructions that receive the external process information and store the external process information in the memory 2242 for further manipulation on the GUI 2214. The approval logic 2240 may include instructions that execute validation, consistency, integrity, or other checks against the received external process information to approve the process information for use in the process control system 2200.

FIG. 22 also shows that the process control system 2200 includes change logic 2244 and setting logic 2246. The change logic 2244 may include instructions that apply a change to any of the process information. For example, the change logic 2244 may store a new parameter input through the GUI 2214 into a database or other memory to change or influence existing process information. The setting logic 2246 may include instructions that set a value for a parameter, such as by storing the value in a database or other memory. The operator may input the values through the GUI.

The approval logic 2240 may also include instructions that validate, verify, or otherwise approve the change to the process information, or any other parameter setting of the process information. The approval logic 2240 may authorize or authenticate operators of the process control system 2200, and may execute compatibility instructions. The compatibility instructions may be received as part of the process information from the external provider.

The process control system 2200 also includes mapping logic 2248 and creation logic 2250. The mapping logic 2248 may include instructions that determine how to update existing process information with newly received external process information. For example, the mapping logic 2248 may determine which process steps, parameters, or parameter values to replace with newly received process steps, parameters, or parameter values. The creation logic 2250 may include instructions that create a new or modified master recipe from the newly received external process information. The creation logic 2250 may also create a process order (e.g., an order to create 1,000,000 tablets of a drug) from the master recipe.

The memory 2242 also includes simulation logic 2252. The simulation logics 2252 may include instructions that simulate processes. The simulation logic 2252 may include, for example, one or more simulation programs installed in the process control system 2200 to verify or validate master recipes, as influenced by the newly provided external process information.

The process control system and method may also relate to a computer program product, in particular stored in a computer readable medium or as a signal, which, when loaded in the memory of a computer carries out the method.

Process control system and method users may manually provide logical instruction steps or may manually select from a given set of logical instruction steps. Users may also manually select from a given set of logical substeps. Logical instruction steps may be chosen from a given list of external logical instruction steps. As an example, external logical instruction steps may be chosen from a set of external logical instruction steps, e.g., "master data management", "process or the creation and release", "dispensing management", "manufacturing execution management", "packaging execution management", "batch review and disposition", and "batch record archiving". In one implementation, the step "master data management" may be chosen from a graphical user interface (referred to as GUI). The GUI represents a visualization of a usability layer custom master data tool. When the visualization is carried out, a number of further external logical instruction steps may be provided (manually or automatically) from which further steps may be chosen (manually or automatically). Such logical instruction steps may be operations, sections, phases and/or instructions. As an example, elements of a master recipe may be chosen, such as production process steps, including: "mixing"; "heating"; and "cutting". The above description may also be applied when logical instruction steps and/or substeps are provided automatically.

The usability layer custom master data tool may be used for the provision of logical instruction steps to manage process instructions. The usability layer custom master data tool may be presented to the user in the GUI. The output of the usability layer custom master data tool may include the process instructions used to build the master recipe process instructions. The master recipe process instructions may be used for the next steps, e.g., the creation of a process order, the usage of the order for the dispensing, packaging flow and so on.

The standard system management environment may be a specific system application that is or can be installed on the computers of a production facility and/or of a pharmaceutical company. The specific system application may be a standard SAP product, e.g., a standard SAP computer program. In particular, the system application may be SAP R/3, and/or mySAP, such as mySAP ERP, mySAP business suite, etc. Particularly, standard system management environment may be based on SAP R/3, and/or mySAP, such as mySAP ERP, mySAP business suite or modifications thereof. A standard system management environment may also be referred to as enterprise resource planning (application/environment).

The process control system and method may include a database that may be any conventional, and/or customized database. In particular, in its simplest form, a database can be a table. Therefore, an external database may include any number of external tables. The tables may be linked or connected to each other.

The process control system may employ external logical instruction steps, which are logical instruction steps that are conventionally not included in a standard system management environment. Rather, external logical instruction steps may be provided individually. As an example, an external logical instruction step may include customized operations, customized sections, customized phases, and/or customized instructions. Master recipes may be created from external logical instruction steps. External logical instruction steps may be part of a customized instruction, set of instructions, or template(s). Therefore, the external logical instruction step is part of the customized system, which may include a standard system in its entirety and/or partly.

The process control system may also employ an external database, which may be a database that is not part of the standard system. Rather, the external database may be provided manually and may be connected, embedded, or introduced into the standard system, and thereby, customizing the standard system. The process control system and method may employ objects otherwise considered "external" to the standard system, which may also be considered "custom" or "customized" objects. The process control method may be embedded, included, or implemented an existing process management system environment, such as a conventional SAP environment. In addition, all the logic may be stored in an existing process management system environment. A local database to the existing process management system environment may be used to store external logical instructions steps. Accordingly, external or customized databases may be introduced into or stored in an existing process management system environment. Similarly, applications that are customized or created by custom programs may also be stored an existing process management environment.

Users may manually select or choose from items displayed in a GUI, e.g., by highlighting or clicking buttons, drop-down lists, words, or fields, which may be coloured. In particular, a selection may be made using interface control devices, such as a mouse, a keyboard, a touch screen, and/or any other suitable controlling/selecting device.

Automatically selecting external logical instructions steps may include loading external logical instruction steps by default. As an example, when choosing the creation of a master recipe, a number of process steps may be loaded automatically, such as providing specific devices, cleaning of specific devices, etc. In other words, the process to automatically add process steps may be performed (manually) by adding a formula process step in the master recipe. The corresponding operands of the formula process steps may be added automatically.

The process control system and method may introduce, map or copy source code related to a logical instruction step into source code of the standard system management environment. Accordingly, using the GUI as a visualization of the usability layer of a master recipe, master recipe process steps may be added, and/or modified, and/or deleted. The process steps may be created with custom logic, and stored in standard database tables in a standard system management environment, e.g., a standard SAP environment. Corresponding data may be stored in custom external database tables, e.g., SAP database tables. Similarly, corresponding logic may be mapped in custom external databases tables (e.g., SAP database tables) in order to manage the control logic used to build Master recipes.

A master recipe or business object master recipe, ("MR"), may include a description of an enterprise-specific process in process industries that does not relate to a specific order. The master recipe may be used to manufacture products. A master recipe typically has a given and/or a predetermined structure. As an example, a master recipe may include a header and several operations, each of which may be carried out at a primary resource. An operation is subdivided into phases. A phase is an independent process step that contains the detailed description of a part of the entire manufacturing process. Phases may be carried out at the primary resource associated with the parent operation. A phase may contain a number of process instructions that convey information relevant to process control. An intermediate logical layer may be included in the process control system to identify a collection of phases that execute a specific action in the process (e.g., pharmaceutical environments may include setup, run and closure sections).

A typical master recipe structure may include the following:

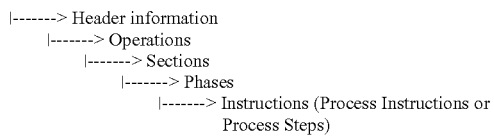

Resources, including primary resources specifically, may be considered production facilities and persons involved in a production process that have capacities. Resources may be subdivided into categories to specify their suitability for certain purposes or their use in certain processes.

In Process Industries, a usability layer ("UL") is a tool that may be used in a standard system management environment (e.g., a standard SAP environment) for production, planning and execution to manage the modification of master recipes (e.g., add, and/or modify, and/or remove process instructions). The UL provides a user-friendly interface used to modify master recipes, and process instructions (i.e., logical instruction steps and external logical instruction steps) inside master recipes. In a standard system management environment the modification of a MR is a time consuming activity that often requires technical expertise. The UL speeds up process of modifying a MR by providing the user with a repository of reusable process steps that may be created in a repository using templates. Process steps stored in a repository may be inserted in a master recipe, and a user may easily configure the process steps to suit specific needs by setting predefined configurable options. For example, in a process step for the acquisition of a numerical value, a user may define an acceptable range of values by assigning upper and lower limits. Modifying a MR with the Usability Layer of the process control system and method does not require any customization expertise.

The process control system and method repository of process steps may include external logical instructions. In particular, the repository of process steps is a custom program, and/or application that allows the user to create new Process Steps, e.g., by choosing from several templates, and/or modifying, and/or copying from an existing process step. The configuration of an existing process step may be changed, and/or deleted. A process step in the repository may be an instance of a template.

In other words, the repository may be regarded as a container, e.g., tables containing instructions. A custom program may be provided to manage the process steps. In particular, a configuration of the tables may be provided, particularly to create templates using the custom program. Hence, the repository provides a manageable collection of tables and instances, which may be manipulated by the custom program.

A template is typically an archetype of process steps. Potential process steps templates may include any combination of the following:

Text instruction;
Numerical input;
Alphanumerical/checkpoint input;
Formula calculation; and
On-line documentation.

The Process steps may be defined in the standard system management environment using custom external characteristics, and/or function characteristics A (browser-based) "PI-Sheet" represents the result of a control recipe that was sent to a process operator, the content of which is displayed on the screen. The PI sheet is an instruction for the process operator that describes how and in which order a product is manufactured. The PI sheet can, for example, contain information about the picking of raw materials as well as instructions about charging the mixer, filling silos, and so on. The PI sheet can be displayed similar to a conventional Internet Browser and/or similar to a conventional browser used in the system management environment. As an example, the PI sheet can be displayed similar to a conventional browser in a standard SAP environment. For the present application, the term "process operator" and "process control" can be used as synonyms.

The Browser is a computer program used for displaying machine code, in particular for displaying and viewing of sites, in which source code is written for the SAP environment. The source code, however, may be written in any suitable language, such as HTML or JavaScript. The machine language may be any conventionally known machine language. Typically, a browser is a computer program which is able to visualize text files as a specific example of data. Any other suitable file format can be visualized. Further to that, a browser might be adapted to visualize other source code, other types of source code, in particular having graphical elements, etc.

Using "control recipes", control data can be transferred from the process order to process control. The information contained in a control recipe and the destination to which it is sent is user-defined.

Engineering Change Management ("ECM") is typically referred to with regard to conventional process industries. In particular, in conventional process industries, requirements for documenting and checking master recipes vary widely depending on the branch of industry and/or the product. The requirements range from a fairly unrestricted recipe editing to detailed planning and documentation, and even strict approval procedures as laid down, for example, by the pharmaceutical industry in the guidelines on Good Manufacturing Practices (GMP). To meet these requirements, conventional system management environments, such as a conventional SAP System offer various types of recipe editing.

Applying the "Master/Slave" feature of the process control system and method to the process steps inside a recipe different process flows may be defined. Conditional (slave) process steps may be defined that allow the activation of alternative process flows, by entering a value inside a master process step.

The process control method external logical instruction steps may include:
duration of production instructions;
dispensing process;
formulation and packaging process; and process for the electronic review of the complete batch record documentation and for the batch disposition.

The process control method may include:

changing, manually and/or automatically, logical instruction steps of external logical instruction steps, such as changing chemical formulas of a stored master recipe through the graphical user interface; and approving the change.

A user of the process control method may be authorized to change a logical instruction step to a different kind of logical instruction step, and/or alter the number of the logical instruction steps, and/or the order/sequence of the external logical instructions steps. Additionally/alternatively, a specific external logical instruction step may be deleted, and if necessary, a further logical instruction step may be introduced. All the actions can be carried out by a user through the graphical user interface. In other words, without any further coding in a program language, a master recipe can be created and/or changed, particularly by the usability layer. Elements of the master recipe can be introduced or deleted by a conventional drag and drop action. The action can be carried out by using a conventional input device such as a mouse, keyboard, touch screen, a bar code scanner, etc.

Similar changes may be carried out to any kind of logical instruction step, such as a chemical formula which can be a substep of a master recipe. The master recipe may represent and/or include general logical instruction steps. Additionally/alternatively, external logical instruction steps may include a production process, and/or the creation, and release management, and/or the dispensing management. Accordingly, external logical instruction steps, which may be substeps of any other external logical instruction steps, may also be introduced, deleted, or changed. The system may request and obtain approval for any such action as introduction, deletion, or change to external logical instruction steps may require approval before being executed.

The approval process may be performed by supervisors, and/or quality assurance ("QA") review, which analyzes the data loaded on the system, and/or automatically by the system.

Changes may be manually and/or automatically performed. In particular, as a rule, a manual change may follow an automatic change. Conversely, as a rule, an automatic change may follow a manual change. For example, when using/introducing the step of mixing chemical materials, the step of mixing may be introduced manually followed automatically by the step of cleaning the mixing device.

The process control method may further include:

providing, manually selecting and/or automatically selecting parameters of the provided logical instruction steps (e.g., materials, weight, volume, temperature, time) from an external parameter database through the graphical user interface; and approving the provided parameters.

For example, introducing the logical instruction step of mixing two materials, in a further step the materials may have to be specified, which may be carried out manually and/or automatically. The user may choose a first material manually from a drop-down list of selectable materials in the visualization of the usability layer, and the second material may be chosen automatically by the system. As another example, while introducing a process step, a user may choose from a drop down list a specific material, resulting in conditional flows to be activated automatically that allow the user to execute additional steps, such as selecting other materials.

The user may choose the first material from a drop-down list or any set of selectable materials, and after choosing the first material, the set of selectable second materials from a drop-down list may be limited. For example, if a user chooses lithium as the first material, water may be excluded from the set of selectable second materials, in order to prevent the accidental selection of water.

The approval of a provided parameter, and/or the change of a parameter may require the user to verify their identity, and/or the group to which they are a member. In one implementation, the identification may be manually performed through the Usability Layer, in combination with a password, an RF-ID tag, or a fingerprint. Identification may also be carried out automatically. Data regarding all users may be stored in the system environment, including the specific rights assigned to each user. A provision/change to parameters is accepted when a user possess a specific set of rights required to perform the provision/change. Otherwise, the provision/change of parameters may be denied, and/or a message may be forwarded to a supervisor of the user or group of users.

According to an alternative implementation, the method may include:

manually and/or automatically setting values and/or changing values of provided parameters through the graphical user interface (e.g., such as values in percentage, values in units of weight, values in units of volume, values in units of temperature and/or values in units of time); and approving inputting values, setting values, and/or changing values.

The user may further specify the chosen parameters, by using the usability layer. A parameter specification may be carried out by inputting values using the graphical user interface. As an example, the user may be provided an input space for inputting the amount of the chosen first material in grams, or kilograms. The amount of the second material may be input in millilitres, or litres. Alternatively/additionally, the amount of a material may be input as a percentage of the total weight of all the materials. The user may input the amount of a mixture to be produced in units of weight (e.g., grams, or kilograms). The user may then input the amount of the first material and the second material as a percentage of the total weight of the mixture. For example, the amount of the first material may be input as 10 percent of the total mixture, and the amount of the second material may be input as 20 percent of the total mixture. The amount of each material may also be introduced automatically.

The process control system and method may be configured to use a SAP platform that is merged with an electronic batch recording device/system. The process control system and method largely improves the functionality of a standard system management environment such as an SAP environment. Logical instruction steps may be provided, and independently thereof, parameters, and/or variables, and/or values of the logical instruction steps may be changed according to the specific needs of a user.

Previously known electronic batch record solutions are merely connected to a conventional enterprise resource planning system, such as a standard system management environment. In contrast, the process control system provides:

compliance checks that can be timely performed along a manufacturing process due to the on-line availability of all relevant information (e.g., material expiration and status, etc.);

full traceability and tracking from the beginning of the supply chain to the shop floor may be performed by one resource;

validations may be performed by only one system;

interfaces among different systems may not be required, since the entire method can be carried out within the system management environment; and audit trails and e-signature may be consistently aligned in a single system.

Approving provisions of logical instruction steps, and/or changes to logical instruction steps may include verifying the compatibility of logical instruction steps by performing compatibility instructions in the standard system management environment. The compatibility instructions may also be included in the logical instruction steps.

Compatibility instructions may be included in source code as an instruction to the standard system management environment (e.g., a standard SAP environment) to verify whether a logical instruction step may be provided, deleted, and/or changed. Whether specific logical instruction steps can work together properly may be verified. As an example, an external database table containing combinations of instructions that are allowed, and/or forbidden may be used to compare provided logical instruction steps, and/or a change to logical instruction steps. For example, the step of packing drugs into packaging cannot be deleted between the steps of producing medical drugs, and shipping medical drugs.

The compatibility instructions may be instructions causing the standard system management environment (e.g., SAP environment) to perform standard features/functions, which may also be native to the SAP environment. Functions and/or routines that are embedded in the standard system management environment may be called as a result of the approving routine, and performed in order to verify the compatibility of external logical instruction steps.

Approving the provision of logical instruction steps, and/or approving the change of logical instruction steps may also include verifying a user's authority to select, and/or change external logical instruction steps by the standard system management environment.

Approving the provision of parameters, and/or approving change to parameters may include verifying a user's authority to provide, select, and/or change parameters.

The logic used for verifying may be included in source code as an instruction to the standard system management environment to verify whether logical instruction steps may be provided, deleted, and/or changed, and/or whether related parameters may be provided, and/or changed. For example, the instructions may direct the system management environment to check/verify whether specific rights are assigned to a user. Such rights may be stored in an internal database table of the standard system management environment, and conventionally given in a standard system management environment. Alternatively/additionally, the rights may be managed in an external database table.

According to one implementation, introducing selected external logical instruction steps into the standard system management environment may include mapping the external logical instruction steps from the external data base into the standard system management environment.

Templates of external logical instruction steps may be custom defined, and stored in external database tables, e.g., standard SAP tables. The logic may also be replicated in custom tables to allow the application to execute controls.

In one implementation, mapping may include copying the external logical instruction steps, and/or providing pointers from the external data base to the standard system management environment.

According to another implementation, the method may further include:

storing selected external logical instruction steps; and/or
changing external logical instruction steps; and/or
selecting parameters; and/or
storing the set values in an external database or in a database of the standard system management environment.

All the data related to the manufacturing and dispensing medical drugs processes, as described in the storing step above, from the point of generating the chemical composition to the specific date/location of delivery may be precisely monitored, and available for later evaluation.

External logical instruction steps, and/or changes to external logical instructions steps, and/or selected parameters, and/or set values that may not be carried out and/or monitored automatically by the method may be introduced into the system manually. In other words, any such steps, such as changes of parameters, values may be written or printed on paper, and scanned to convert the information on paper into a digital format, such as a PDF formatted file. Such a PDF file may be introduced into an external or internal database of the system. In other words, an external logical instruction step may include delivering, and/or providing materials, and/or shipping produced medical drugs manually. An operator may then verify completion of the delivery by manually writing a respective note. The note can be scanned and introduced into the system as a PDF formatted file, a tiff file, a jpg file or any other suitable file.

According to one implementation, the method may further include the steps:

creation of a master recipe from one or more of the provided logical instruction steps; and creation of a process order from the master recipe.

External logical instruction steps that are manually and/or automatically provided, selected from a set of available external logical instruction steps, may be used to create a master recipe.

According to one implementation, a master recipe may be a detailed description of how to produce a medical drug.

A process order may be created from a master recipe. The process order may include technical steps for creation of a medical drug. If necessary, a process order may also include further information, e.g., packaging of the drugs.

The process control method may also include the step of simulating a process according to logical instruction steps of a master recipe, before actually performing the real process steps (e.g., manufacturing, and/or dispensing). The process may be simulated using an existing process management environment, such as a standard system management environment, in accordance with external logical instruction steps. Consequently, potential conflicts and/or malfunctions may be easily discovered, reported and/or displayed.

The method may also include creating a visual display of the process order.

Hence, a usability layer may be an integral part of the process control system and method. The usability layer of the system and method, described by example here and not limited thereto, allows for the provisioning of a graphical user interface, provisioning of external logical instruction steps, introduction of logical instruction steps, approval of provisions, changes to external logical instruction steps, providing parameters, setting values generally and setting values for parameters specifically, creating a master recipe, process simulations, and displaying process orders.

Another aspect of the process control system, in one implementation, relates to a data processing device and/or logic for controlling, and/or monitoring the manufacturing process and/or dispensing process of medical drugs. The data processing device and/or logic may include:
- a display device that provides a graphical user interface (GUI) in a standard system management environment (e.g., an SAP environment employing SAP R/3, and/or mySAP);
- a provider that provides external logical instruction steps, manually and/or automatically selecting external logical instruction steps, such as process steps and/or chemical formulas of a master recipe from an external database through the graphical user interface (GUI), wherein the external logical instruction steps are external to an existing process management environment, such as a standard system management environment;
- an introduction device and/or introduction logic operable to introduce external logical instruction steps into an existing process management environment, such as a standard system management environment;
- an approval device and/or approval logic operable to approve the provision of logical instruction steps for an existing process management environment, such as a standard system management environment; and
- a process controller operable to control, and/or monitors processes using the existing process management environment in accordance with the logical instruction steps.

In one implementation, the provider is interconnected to the GUI, allowing a user to select external logical instruction steps using the GUI.

The data processing device and/or logic may also include:
- a changing device and/or change logic operable to apply a change, manually input through the GUI and/or automatically, to external logical instruction steps, e.g., changing chemical formulas of a stored maser recipe through the graphical user interface, wherein the approval device and/or approval logic approves the change;
- a communication interface operable to receive a parameter for one external logical instruction steps, wherein the approval device and/or approval logic approves the change; and
- setting logic operable to set a value for a parameter input through the GUI, wherein the approval device and/or approval logic approves the change.

The provider may also be used to manually, and/or automatically select parameters of the provided external logical instruction steps (e.g., materials, weight, volume, temperature, and time) from an external parameter database through the graphical user interface, wherein the approval device and/or approval logic approves the provided parameters.

The data processing device may include a setting device that is used to manually and/or automatically set values, and/or change values of the provided parameters through the graphical user interface, wherein the approval device is used to approve the values. Parameter values that may be set, for example, include: values in percentage; value in units of weight; values in units of volume; values in units of temperature; and/or values in units of time.

In one implementation of the data processing device, the approval device is operable to approve the provision of logical instruction steps, and/or approve changes to logical instruction steps, by verifying the compatibility of logical instruction steps, by performing compatibility instructions within the standard system management environment, wherein the compatibility instructions are in the logical instruction steps.

The approval device may further be operable to approve the provision of logical instruction steps, and/or the change of logical instruction steps, by verifying whether a user has the authority to select and/or check the external logical instruction steps within the process management system, such as a standard system management environment.

The approval device may be operable to approve the provision of the parameters and/or the change of parameters, by verifying whether a user has the authority to provide parameters, select parameters, and/or change parameters within the process management system, such as a standard system management environment.

The introduction device and/or introduction logic may be used to introduce selected external logical instruction steps into the standard system management environment, by mapping the external logical instruction steps from the external database into the process management environment, such as a standard system management environment.

The data processing device may include a storing device operable to store, in an external database or in a database of the process management system, such as a standard system management environment, selected external logical instruction steps, and/or changed logical instruction steps, and/or selected parameters, and/or set values.

The data processing device further may include a creation device, and/or creation logic operable to:
- create a master recipe from provided external logical instruction steps; and
- create a process order from a master recipe.

The data processing device may include a simulator and/or simulation logic operable to simulate a process using an existing process management environment in accordance with provided logical instruction steps related to a master recipe.

The display device may be used to create a visual display of a process order.

The process control system and method may also include a usability layer. The usability layer may include: providers; an introduction device; an approval device; a changing device; a setting device; a creation device; a simulator; and a visual display device.

Selected aspects, features, and components of the implementations are depicted as being stored in memories. However, all or part of the process control systems, including methods and/or instructions for performing methods, may be stored on, distributed across, or read from other machine-readable media. The machine-readable media may include secondary storage devices such as hard disks, floppy disks, and CD-ROMs; a signal received from a network; or other forms of ROM or RAM either currently known or later developed.

The logic that implements the process control system may include any combination of hardware and software, which may vary widely in implementation. For example, a processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The functionality of the process control system may be distributed among multiple computer systems. Parameters, databases, and other data structures may be separately stored and managed, may be incorporated into a single memory or database, or may be logically and physically organized in many different ways. Any of the logic described may be implemented with programs that are parts of a single program, as separate programs, or distributed across several memories and processors.

The above-described computing system is only one example of the type of computing system that may be used to implement the method for controlling and/or monitoring. The architecture of the method according to the present invention and/or the respective apparatus is based on a conventional client-server architecture such as SAP architecture. Some elaboration may be executed on local workstation(s). The main process and database is managed on the server side of the application.

The invention claimed is:

1. A process control method comprising:
   providing a graphical user interface (GUI) internally to an existing process management environment that controls a process;
   displaying on the GUI commercially available process information from an independent remote external provider and accepting a selection of external logical instruction steps from the commercially available process information;
   in response to the selection, connecting over a network interface to the independent remote external provider and purchasing the external logical instruction steps from the independent remote external provider for delivery into the existing process management environment;
   receiving the external logical instruction steps from the independent remote external provider with respect to the existing process management environment and with respect to the GUI;
   receiving compatibility instructions for the external logical instruction steps from the independent remote external provider;
   introducing the external logical instruction steps into the existing process management environment;
   controlling the process using the existing process management environment in accordance with the external logical instruction steps.

2. The process control method of claim 1, further comprising:
   accepting a change to at least one of the external logical instruction steps through the GUI; and
   approving the change.

3. The process control method of claim 1, further comprising:
   providing a parameter for at least one of the external logical instruction steps through the GUI from an external parameter database of the independent remote external provider; and
   approving the parameter.

4. The process control method of claim 3, further comprising:
   setting a value for the parameter through the GUI; and
   approving the value.

5. The process control method of claim 3, approving the parameter further comprising: verifying user authority to select the parameter.

6. The process control method of claim 1, approving further comprising: verifying user authority to make the selection.

7. The process control method of claim 1, introducing further comprising: mapping the external logical instruction steps from an external database of the independent remote external provider into the existing process management environment.

8. The process control method of claim 1, further comprising:
   storing the external logical instruction steps in a local database in the existing process management environment.

9. The process control method of claim 1, further comprising:
   creating a master recipe from the external logical instruction steps; and
   creating a process order from the master recipe.

10. The process control method of claim 9, further comprising:
    simulating the process using the existing process management environment in accordance with the external logical instruction steps.

11. The process control method of claim 9, further comprising:
    creating a visual display of the process order.

12. The process control method of claim 1, where receiving the external logical instructions steps comprises:
    receiving the external logical instruction steps over a network connection from an independent remote external provider that has commercialized the external logical instruction steps for delivery to purchasers of the external logical instruction steps.

13. The process control method of claim 1, where the independent remote external provider is an independent research agency that researches, develops, and refines drug manufacturing processes.

14. The process control method of claim 1, where the independent remote external provider is an independent electronic storefront that provides research, development, and refined drug manufacturing processes information.

15. The process control method of claim 1, further comprising:
    approving the external logical instruction steps for the existing process management environment by performing the compatibility instructions to verify compatibility of the external logical instruction steps in the existing process management environment.

16. A process control system comprising:
    a display that provides a graphical user interface (GUI) for an existing process management environment that controls a process, displays on the GUI commercially available process information from an independent remote external provider, and accepts a selection of external logical instruction steps from the commercially available process information;
    a network interface to the independent remote external provider that connects to the independent remote external provider for purchasing the external logical instruction steps for delivery into the existing process management environment;
    a communication interface operable to receive the external logical instruction steps and compatibility instructions for the external logic instruction steps from an independent remote external provider with respect to the existing process management environment;
    introduction logic operable to introduce the external logical instruction steps into the existing process management environment;
    a process controller operable to control the process using the existing process management environment in accordance with the external logical instruction steps.

17. A process control system according to claim 16, further comprising:
    change logic operable to apply a change, input through the GUI, to at least one of the external logical instruction steps; and where the approval logic is further operable to approve the change.

18. A process control system according to claim 16, where the communication interface is further operable to receive a parameter for at least one of the external logical instruction steps from the independent remote external provider; and where the approval logic is further operable to approve the parameter.

19. A process control system according to claim 18, where: the approval logic is further operable to verify user authority to select the parameter.

20. A process control system according to claim 16, further comprising:
setting logic operable to set a value for the parameter input through the GUI; and where the approval logic is further operable to approve the value.

21. A process control system according to claim 16, where: the approval logic is further operable to verify user authority to make the selection.

22. A process control system according to claim 16, where the introduction logic comprises: mapping logic operable to map the external logical instruction steps from an external database of the independent remote external provider into the existing process management environment.

23. A process control system according to claim 16, further comprising a local database in the existing process management environment for storing the external logical instruction steps.

24. A process control system according to claim 16, further comprising creation logic operable to: create a master recipe from the external logical instruction steps; and create a process order from the master recipe.

25. A process control system according to claim 16, further comprising simulation logic operable to: simulate the process using the existing process management environment in accordance with the external logical instruction steps.

26. A process control system according to claim 25, where the GUI renders a visual display of the process order.

27. The process control method of claim 16, wherein the communication interface comprises a network interface operable to receive the external logical instruction steps from the independent remote external provider operating independently from the existing process management environment.

28. A process control system according to claim 16, where the independent remote external provider is an independent research agency that researches, develops, and refines drug manufacturing processes.

29. A process control system according to claim 16, where the independent remote external provider is an independent electronic storefront that provides research, development, and refined drug manufacturing processes information.

30. A process control system according to claim 16, further comprising:
approval logic operable to approve the external logical instruction steps for the existing process management environment by performing the compatibility instructions to verify the compatibility of the external logical instruction steps in the existing process management environment.

31. A computer system memory comprising processor executable instructions to:
provide a graphical user interface (GUI) in an existing process management environment that controls a process;
display on the GUI commercially available process information from an independent remote external provider and accept a selection of external logical instruction steps from the commercially available process information;
in response to the selection, connect over a network interface to the independent remote external provider and purchase the external logical instruction steps from the independent remote external provider for delivery into the existing process management environment;
receive the external logical instruction steps from an independent remote external provider with respect to the existing process management environment;
receive compatibility instructions for the external logical instruction steps from the independent remote external provider;
introduce the external logical instruction steps into the existing process management environment;
control the process using the existing process management environment in accordance with the external logical instruction steps.

32. A computer system memory according to claim 31, further comprising processor executable instructions to:
accept a change to at least one of the external logical instruction steps through the GUI; and
approve the change.

33. A computer system memory according to claim 31, further comprising processor executable instructions to:
verify user authority to select the external logical instruction steps.

34. A computer system memory according to claim 31, further comprising processor executable instructions to:
create a master recipe from the external logical instruction steps; and
create a process order from the master recipe.

35. A computer system memory according to claim 34, further comprising processor executable instructions to:
simulate the process using the existing process management environment in accordance with the external logical instruction steps.

36. The computer system memory of claim 31, further comprising processor executable instructions to:
receive a parameter for at least one of the external logical instruction steps from the independent remote external provider.

37. The computer system memory of claim 31, further comprising processor executable instructions to:
map the external logical instruction steps from an external database of the independent remote external provider into the existing process management environment.

38. The computer system memory of claim 31, where the independent remote external provider is an independent research agency that researches, develops, and refines drug manufacturing processes.

39. The computer system memory of claim 31, where the remote external provider is an independent electronic storefront that provides research, development, and refined drug manufacturing processes information.

40. A computer system memory according to claim 31, further comprising processor executable instructions to:
approve the external logical instruction steps for the existing process management environment by performing the compatibility instructions to verify compatibility of the external logical instruction steps in the existing process management environment.

* * * * *